US011910438B2

(12) United States Patent
Nguyen et al.

(10) Patent No.: US 11,910,438 B2
(45) Date of Patent: Feb. 20, 2024

(54) LISTEN BEFORE TALK SEQUENCE DESIGN FOR WIRELESS COMMUNICATION

(71) Applicant: QUALCOMM Incorporated, San Diego, CA (US)

(72) Inventors: Tien Viet Nguyen, Bridgewater, NJ (US); Sudhir Kumar Baghel, Fremont, CA (US); Kapil Gulati, Belle Mead, NJ (US); Libin Jiang, Seattle, WA (US); Zhibin Wu, Los Altos, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/456,551

(22) Filed: Nov. 24, 2021

(65) Prior Publication Data

US 2022/0086909 A1    Mar. 17, 2022

Related U.S. Application Data

(62) Division of application No. 16/153,270, filed on Oct. 5, 2018, now Pat. No. 11,212,837.

(Continued)

(51) Int. Cl.
*H04W 72/04*  (2023.01)
*H04W 74/08*  (2009.01)
(Continued)

(52) U.S. Cl.
CPC ....... *H04W 74/0816* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS

| 9,526,091 B2 | 12/2016 | Chou |
| 9,661,658 B2 | 5/2017 | Li et al. |

(Continued)

FOREIGN PATENT DOCUMENTS

| WO | 2004109936 A2 | 12/2004 |
| WO | 2016018079 A1 | 2/2016 |
| WO | 2016071148 A1 | 5/2016 |

OTHER PUBLICATIONS

International Preliminary Report on Patentability—PCT/US2018/054817, The International Bureau of WIPO—Geneva, Switzerland, Apr. 30, 2020.

(Continued)

*Primary Examiner* — Willie J Daniel, Jr.
(74) *Attorney, Agent, or Firm* — Arent Fox, LLP

(57) ABSTRACT

An apparatus for wireless communication of a UE determines to transmit data in a set of RBs to at least one other UE in at least one subframe. The at least one subframe includes a first subset of symbols configured for use for transmission collision avoidance signaling and a second subset of symbols configured for transmitting the data. The apparatus determines a subset of symbols of the first set of symbols within the set of RBs of the at least one subframe for transmitting at least one concatenated sequence. The apparatus transmits the at least one concatenated sequence in each symbol of the determined subset of symbols within the set of RBs of the at least one subframe to indicate that the data will be transmitted in the second set of symbols within the set of RBs of the at least one subframe.

34 Claims, 14 Drawing Sheets

Related U.S. Application Data

(60) Provisional application No. 62/574,642, filed on Oct. 19, 2017.

(51) Int. Cl.
| | | |
|---|---|---|
| *H04L 5/00* | (2006.01) | |
| *H04L 27/00* | (2006.01) | |
| *H04W 4/40* | (2018.01) | |
| *H04W 72/0446* | (2023.01) | |
| *H04W 4/44* | (2018.01) | |

(52) U.S. Cl.
CPC .......... *H04L 27/0006* (2013.01); *H04W 4/40* (2018.02); *H04W 72/0446* (2013.01); *H04W 4/44* (2018.02)

(56) References Cited

U.S. PATENT DOCUMENTS

| | | |
|---|---|---|
| 2013/0272132 A1 | 10/2013 | Heo et al. |
| 2013/0272262 A1 | 10/2013 | Li et al. |
| 2017/0086216 A1 | 3/2017 | Patil et al. |
| 2017/0188391 A1 | 6/2017 | Rajagopal et al. |
| 2017/0310434 A1 | 10/2017 | Harada et al. |
| 2018/0184408 A1* | 6/2018 | Xue ................ H04L 5/0048 |
| 2019/0036667 A1* | 1/2019 | Wang ............... H04L 5/0055 |
| 2019/0124693 A1 | 4/2019 | Nguyen et al. |
| 2019/0379560 A1* | 12/2019 | Choi ................ H04L 5/0051 |

OTHER PUBLICATIONS

International Search Report and Written Opinion—PCT/US2018/054817—ISA/EPO—Jan. 21, 2019.
Lenovo: "Mechanisms for V2V Resource Allocation", 3GPP TSG RAN WG1 Meeting #84, 3GPP Draft, R1-161014, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 14, 2016 (Feb. 14, 2016), XP051054318, 8 Pages, Retrieved from the Internet: URL:http://www.3gpp.org/ftp/Meetings_3GPP_SYNC/RAN1/Docs/ [retrieved on Feb. 14, 2016].

* cited by examiner

LISTEN BEFORE TALK SEQUENCE DESIGN FOR WIRELESS COMMUNICATION

CROSS-REFERENCE TO RELATED APPLICATION(S)

This application is a Divisional of U.S. application Ser. No. 16/153,270, entitled "LISTEN BEFORE TALK SEQUENCE DESIGN FOR WIRELESS COMMUNICATION" and filed on Oct. 5, 2018, which claims the benefit of U.S. Provisional Application No. 62/574,642, entitled "LISTEN BEFORE TALK SEQUENCE DESIGN FOR WIRELESS COMMUNICATION" and filed on Oct. 19, 2017, both of which are expressly incorporated by reference herein in their entirety.

BACKGROUND

Technical Field

The present disclosure relates generally to communication systems, and more particularly, to wireless communication using one or more concatenated sequences.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In NR Vehicle-to-Everything (V2X), one media access control (MAC) paradigm is collision reduction or avoidance. Multiple UEs may attempt to communicate at the same time. As a result, collisions may occur resulting in detection errors and poor performance. Thus, it is desirable to have robust detection performance for sequences for collision avoidance and data decoding fidelity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In NR V2X, one MAC paradigm is collision reduction or avoidance. Multiple UEs may attempt to communicate with a single UE at the same time. As a result, collisions may occur, resulting in detection errors and poor performance. Thus, it is desirable to have robust detection performance for sequences for collision avoidance and data decoding fidelity.

To address the issue of data collisions and other issues, aspects of the present disclosure are directed to sequence design and transmission along with data for improved detection for collision avoidance.

In an aspect of the disclosure, a method, a computer-readable medium, and an apparatus of wireless communication are provided. The apparatus includes a memory and at least one processor coupled to the memory. The processor(s) are configured to determine to transmit data in a set of resource blocks (RBs) to at least one other UE in at least one subframe. The subframe(s) include a first subset of symbols configured for use for transmission collision avoidance signaling and a second subset of symbols configured for transmitting the data. The processor(s) are also configured to determine a subset of symbols of the first set of symbols within the set of RBs of the subframe(s) for transmitting at least one concatenated sequence. The processor(s) are further configured to transmit the at least one concatenated sequence in each symbol of the determined subset of symbols within the set of RBs of the subframe(s) to indicate that the data will be transmitted in the second set of symbols within the set of RBs of the subframe(s).

In another aspect of the disclosure, a method, a computer-readable medium, and an apparatus of wireless communication are provided. The apparatus includes a memory and at least one processor coupled to the memory. The processor(s) are configured to receive a transmission in a subset of symbols from at least one UE. Each transmission received includes at least one concatenated sequence in each symbol of the subset of symbols for transmission collision avoidance signaling. The processor(s) are also configured to determine a set of RBs on which each transmission is received from the UE(s). Additionally the processor(s) are configured to determine, for each received transmission for a UE of the at least one UE, that data may be received from the UE on the determined set of RBs. The processor(s) are further configured to receive data on each determined set of RBs associated with each UE of the at least one UE. The transmission and the data are received on at least one subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
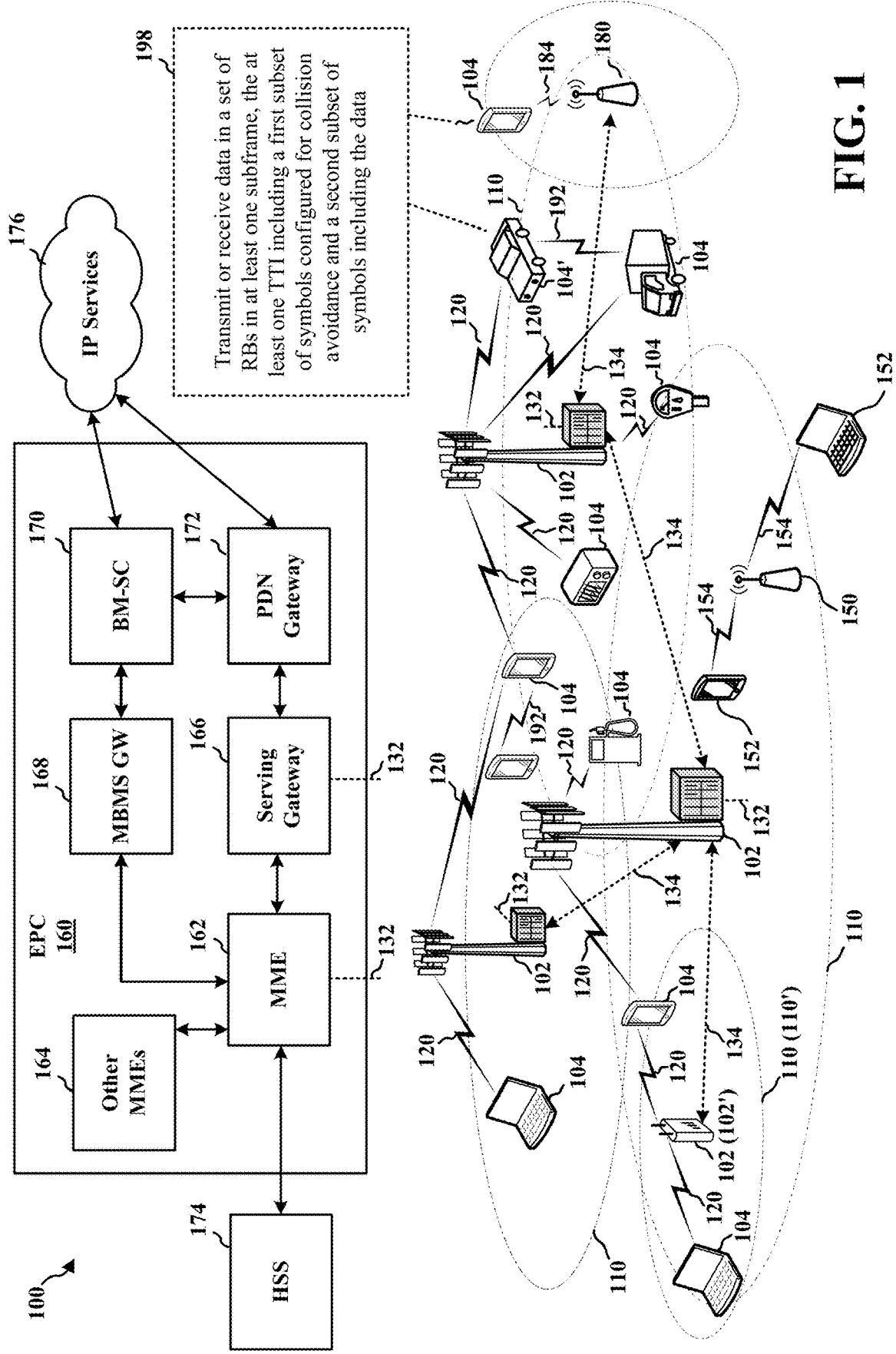
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., 51 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104 may communicate with at least one other UE 104'. In some examples, the UE 104 and/or the other UE 104' may be included in vehicles and, therefore, one or both of the UE 104 and/or the other UE 104' may be configured for Vehicle-to-Everything (V2X) communication.

The UE 104 may be configured to transmit data in a set of RBs in at least one transmission time interval (TTI), and the at least one TTI may include a first subset of symbols configured for collision avoidance signaling and a second subset of symbols configured for data signaling, as discussed infra (198). In an aspect, a TTI may be a subframe. The other TTIs may be slots—e.g., one subframe may include two slots.

In an aspect, the UE 104 may be configured to determine to transmit data in a set of resources blocks (RBs) to at least one other UE 104' in at least one subframe, and the at least one subframe may include a first subset of symbols configured for use for transmission collision avoidance signaling and a second subset of symbols configured for transmitting data. The UE 104 may determine a subset of symbols of the first subset of symbols within the set of RBs of the at least one subframe for transmitting at least one concatenated sequence. The UE 104 may transmit the at least one concatenated sequence in each symbol of the determined subset of symbols within the set of RBs of the at least one subframe to indicate that data will be transmitted in the second subset of symbols within the set of RBs of the at least one subframe.

Correspondingly, the other UE 104' may be configured to receive data in a set of RBs in at least one TTI, and the at least one TTI may include a first subset of symbols configured for collision avoidance signaling and a second subset of symbols configured for data signaling, as discussed infra (198). In an aspect, the TTI may be a subframe. The other TTIs may be slots—e.g., one subframe may include two slots.

The other UE 104' may receive a transmission in a subset of symbols from the UE 104. The transmission may include at least one concatenated sequence in each symbol of the subset of symbols for transmission collision avoidance signaling. The other UE 104' may determine a set of RBs on which the transmission is received from the UE 104. The other UE 104' may receive data on the determined set of RBs associated with the UE 104, and the transmission and the data may be received on at least one subframe.

Figure 2:
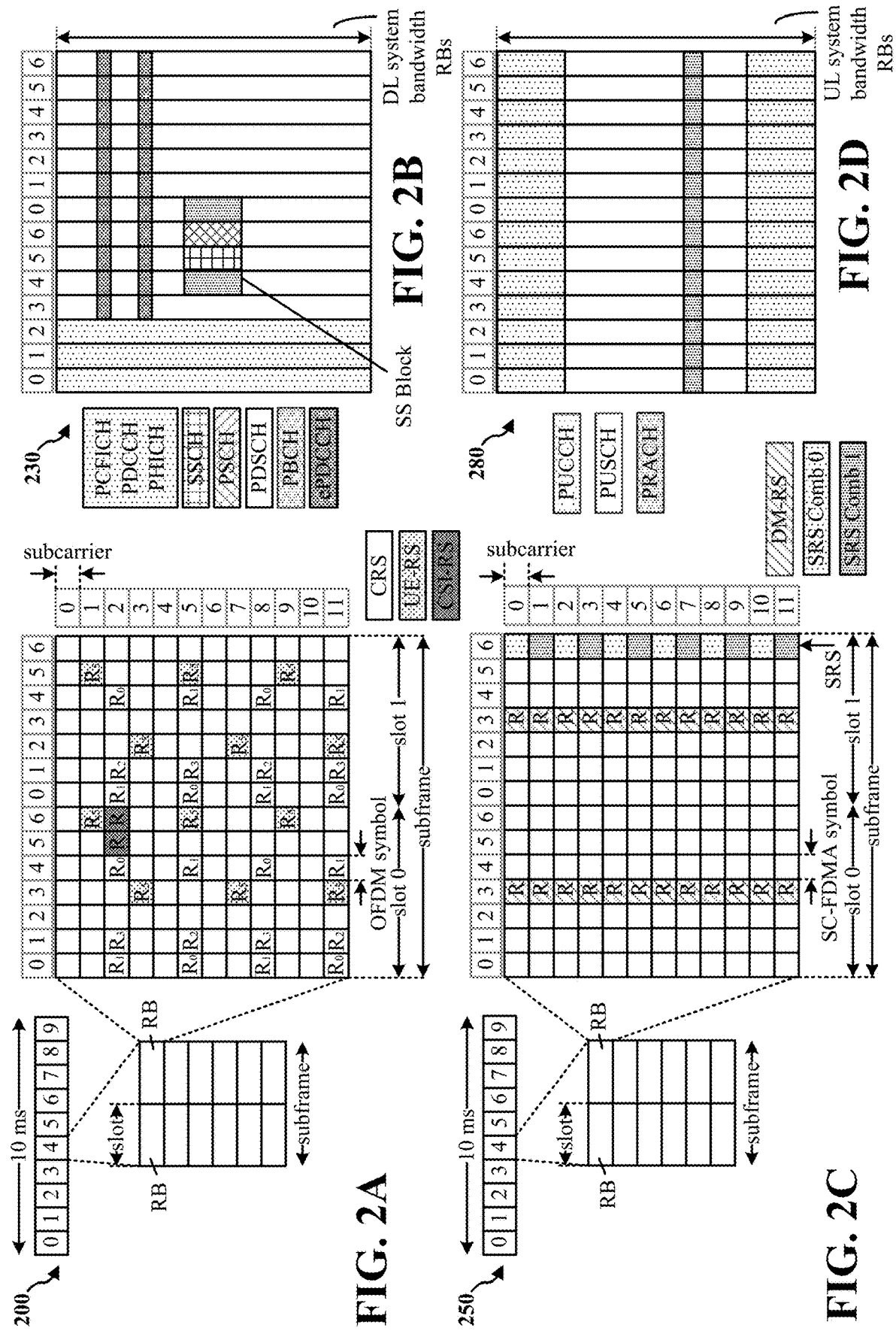
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent RBs (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
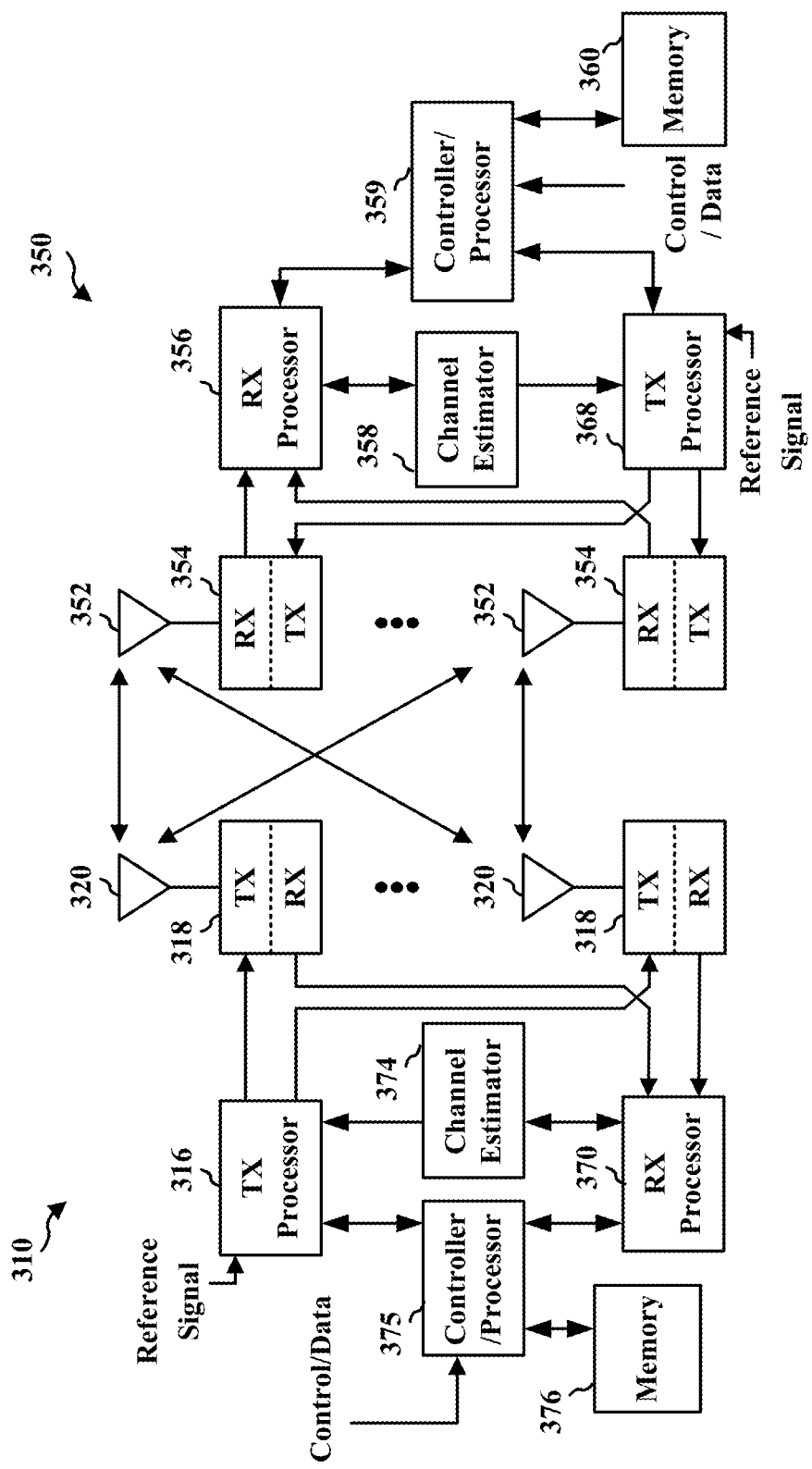
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In wireless communication, such as NR V2X, for example, multiple UE's may attempt to communicate with a single UE at the same time. As such, transmission collisions may occur and may result in poor performance. Thus, one MAC issue is collision reduction or avoidance.

Accordingly, in wireless communication, such as NR V2X system, for example, it is desirable to have robust detection performance for sequences such as listen-before-talk (LBT) sequences (since it may dictate the performance of the system at both MAC level, e.g. collision avoidance level and link level, e.g. data decoding). Also, it is desirable for the detection process to be lower in complexity since this operation may be performed multiple times in each subframe. In order to achieve these two aspects, careful choice of sequences (e.g., LBT sequences) may be one key factor.

To address these issues, aspects of the present disclosure are directed to LBT sequence techniques. In accordance with aspects of the present disclosure the LBT sequences may be transmitted using subchannelization techniques. That is, the bandwidth for transmission may be divided into subchannels. In some aspects, the subchannels may be equal in size. For example, the size of each sub-channel may be 5 RBs (or 60 REs). Of course, this is merely exemplary and not limiting. In another example, the size of the subchannel may be a multiple of 5 RBs. As such, the length of the partial overlapping part of any 2 sequences may also be a multiple of 5 RBs. In some aspects, the LBT sequence may be provided in a comb-like structure. That is, the LBT sequence may be transmitted in every other subcarrier of each symbol. Transmitting the LBT in a comb-like structure may beneficially enable automatic gain control (AGC) training at detection. Thus, partial orthogonality may be achieved by choosing each LBT sequence as a concatenation or merging of multiple sequences, e.g., Zadoff-Chu (ZC) sequences of length 30. In one example, ZC sequences are used in each subchannel. If the sequences are overlapped, their overlapping parts must also be a concatenation of ZC sequences, and hence are either identical or orthogonal.

In accordance with aspects of the present disclosure, the detection complexity may also be reduced. In order to keep the number of blind detections attempt low, the number of possible sequences (e.g., ZC sequences) in each sub-channel may be small. Keeping the number of sequencer per channel small may be beneficial because having too many possible ZC sequences in each sub-channel may negatively affect detection quality since false alarm probability increases linearly with the number of sequences. By way of example only, the number of possible sequences in each subchannel may be four or less. One way to achieve processing capability comparable to DMRS in LTE with 4 sequences is to have one sequence for a start subchannel, one sequence for a middle subchannel, one sequence for an end subchannel and one sequence for a stand-alone subchannel. As such, the LBT sequence for a four subchannels allocation may be "start-mid-mid-end" and for a one subchannel allocation may be "alone".

In some aspects, the detection complexity may be relaxed to allow more than 4 possible sequences in each subchannel. For example, multiple set of such sets of 4 sequences may be included in each subchannel. The UE may randomly choose between these sets of sequences. This extra randomness improves detection probability in case of overlapping. Additionally, in some aspects, the set of sequences may be pre-configured or may be configured by the network (e.g., base station), for instance. Furthermore, since the LBT sequence is close to and may be transmitted in the same antenna port with the control part of the data, in some aspects, the LBT sequence may be used as the pilot and for channel estimation for control decoding. As such, the spectral efficiency may be improved.

To detect a sequence or portion thereof (e.g., sub-sequence), a cross-correlation process may be performed in which the received signal is compared with the known sequences (e.g., ZC sequences). For example, the cross-correlation process may be performed in the frequency domain by multiply the received signal in frequency domain with the conjugate of a known sub-sequence to get the frequency response. The frequency response may then be converted to time domain channel impulse by computing the fast Fourier transform (FFT). The presence of the known sub-sequence may be characterized by one or more strong peaks in the impulse response. Thus, the peak of this impulse response may be considered as an estimator. In one example, the estimator may be used as an indication of how "likely" there is the known ZC sequence in this sub-channel (Soft-detection). In a second example, the estimator may be compared against a threshold to get a hard decision. The threshold may be selected to balance the sensitivity and false alarms. The sensitivity scales linearly with the threshold, while the false alarms scale exponentially with the threshold. The false alarm probability is given by $p=\exp(-c_1 T)$ and the misdetection probability is given by $q=1-\exp(-c_2 T)$ which is approximately $c_2 T$ at a target SNR level with $c_1$ and $c_2$ be constant depending on implementation details. In one exemplary aspect, a desired false alarm may serve as a starting point and may be used to derive the threshold as $-\log(p)/c_1$. Then, the sensitivity may be derived accordingly as $q=-\log(p)*c_2/c_1$.

In one aspect, a UE may implement diversity (e.g., reception diversity). With reception diversity, the UE may include a plurality of receive chains configured for signal reception and, therefore, may receive the same signal. With reception diversity, the UE may perform cross-correlation estimation separately for each of the plurality of receive chains in order to determine weights for each of the plurality of receive chains. The UE may determine a primary receive chain corresponding to a strongest weight because the primary receive chain has more antenna gains than the other receive chains and, therefore, should be given greater weight than the other receive chains. The UE may determine a weighted average of an estimator on a signal received by the plurality of receive chains (e.g., the output of each receive chain may be weighted based on a respective antenna gain of each receive chain). The UE may then use the weighted average for a hard and/or soft decision. Furthermore, when the UE detects a long sequence that includes a plurality a short sequences, the UE may compute the cross-correlation for each short sequence and compute the sum of the cross-correlation results as the estimator of the long sequence. The UE may use the estimator of the long sequence (e.g., based on the estimation of the cross-correlation of each of the short sequences) to perform hard and/or soft decisions for the long sequence.

The detection of each sub-sequence may be performed independently with each other. As such, if there are k possible sequences, the composite false alarm probability or the probability that there is at least one sequence detected given that there is no sequence sent) may be expressed as $p=k*\exp(-c_1 T)$. On the other hand the mis-detection probability or the probability that a certain sequence is not detected given that it is transmitted may be expressed as $q=1-\exp(-c_2 T)$. So, given a target false alarm probability p, $T=-\log(p/k)/c_1$ and misdetection probability is $q=-q=-\log(p/k)*c_2/c_1$.

On the transmit (Tx) path, the LBT detection may be used for collision avoidance purpose. The probability that there is at least one sequence may be more relevant than the actual identity of the sequence. For this reason, hard detection may be used in most of the cases. Furthermore, for collision avoidance purpose, small false alarm probability is desirable (of order 1%, so less resource is wasted) and the threshold may be derived as described above.

For some cases, for example, when the packet need to be transmitted in the current TTI without any delay and there is no available resource based on the hard detection criteria, soft detection criteria may be used to rank the resources in decreasing order of likelihood to be occupied. Then the packet may be transmitted on the resource least likely to be occupied.

On a receive (Rx) path, soft detection may be more favorable. In particular, the individual sub-sequence estimator may be combined to get a total estimator of a long sequence. One possible result of combining operation is the sum, which may be equivalent to an RSRP type of measurement. The RB locations for a decoding attempt are decoded in the decreasing order of the combined indicator. Another advantage of this method is that many of the operation can be reused for channel estimation for decoding the control information.

Figure 4:
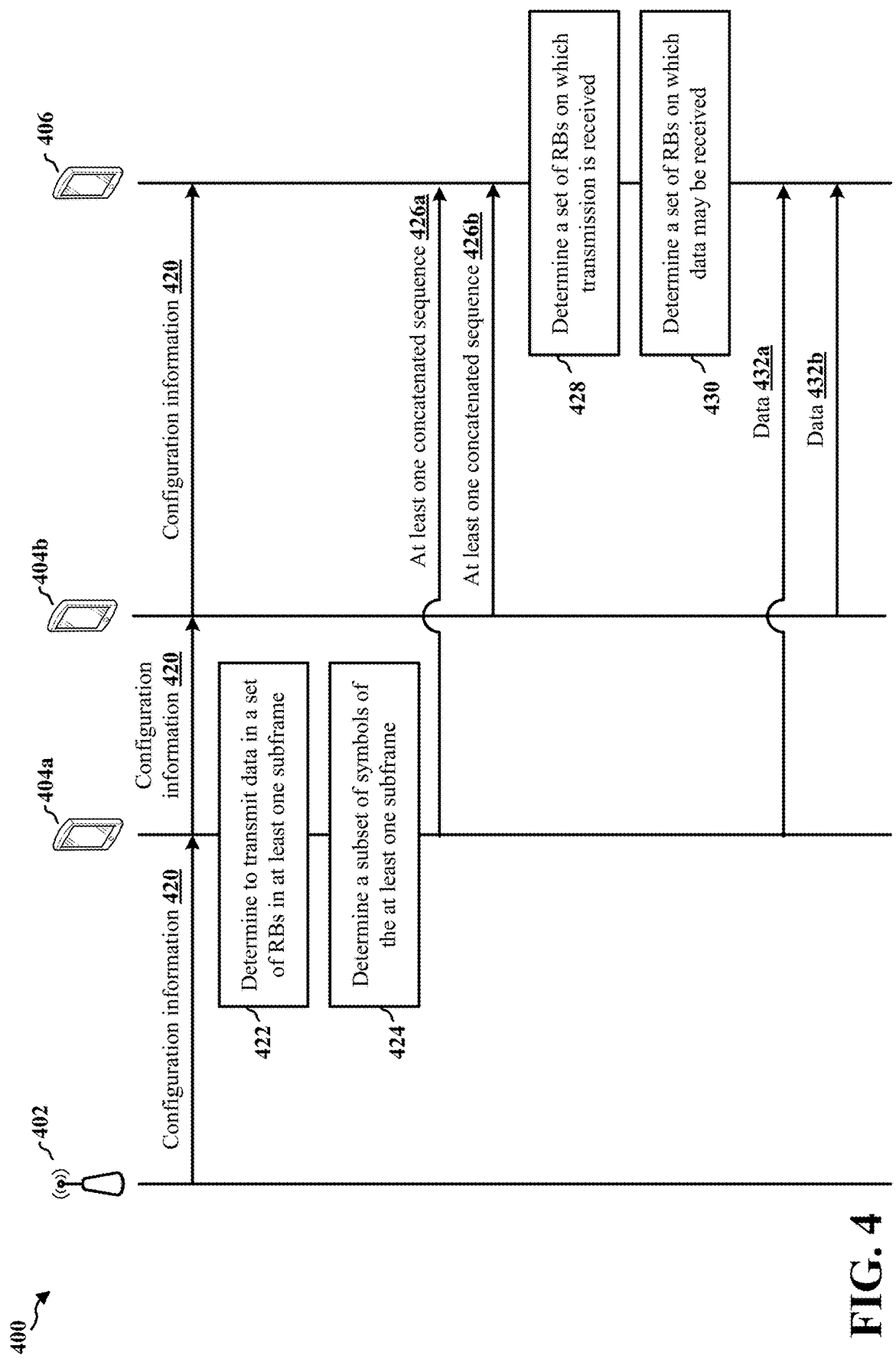
FIG. 4 is a call flow diagram illustrating an exemplary method of wireless communication.
Figure 5:
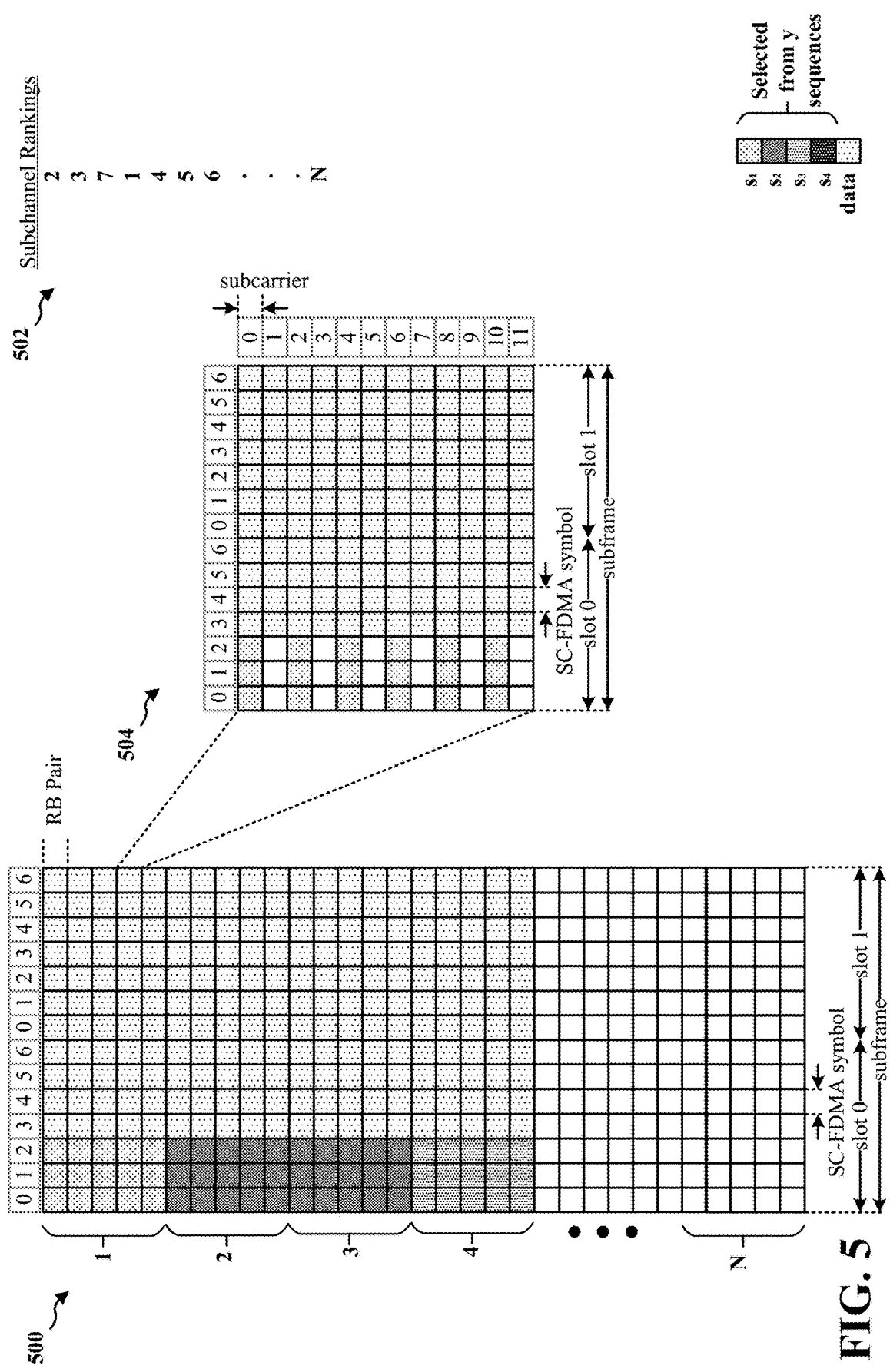
FIG. 5 is a diagram illustrating exemplary transmission time intervals (TTIs) for communication of V2X collision avoidance signaling and data.
Figure 6:
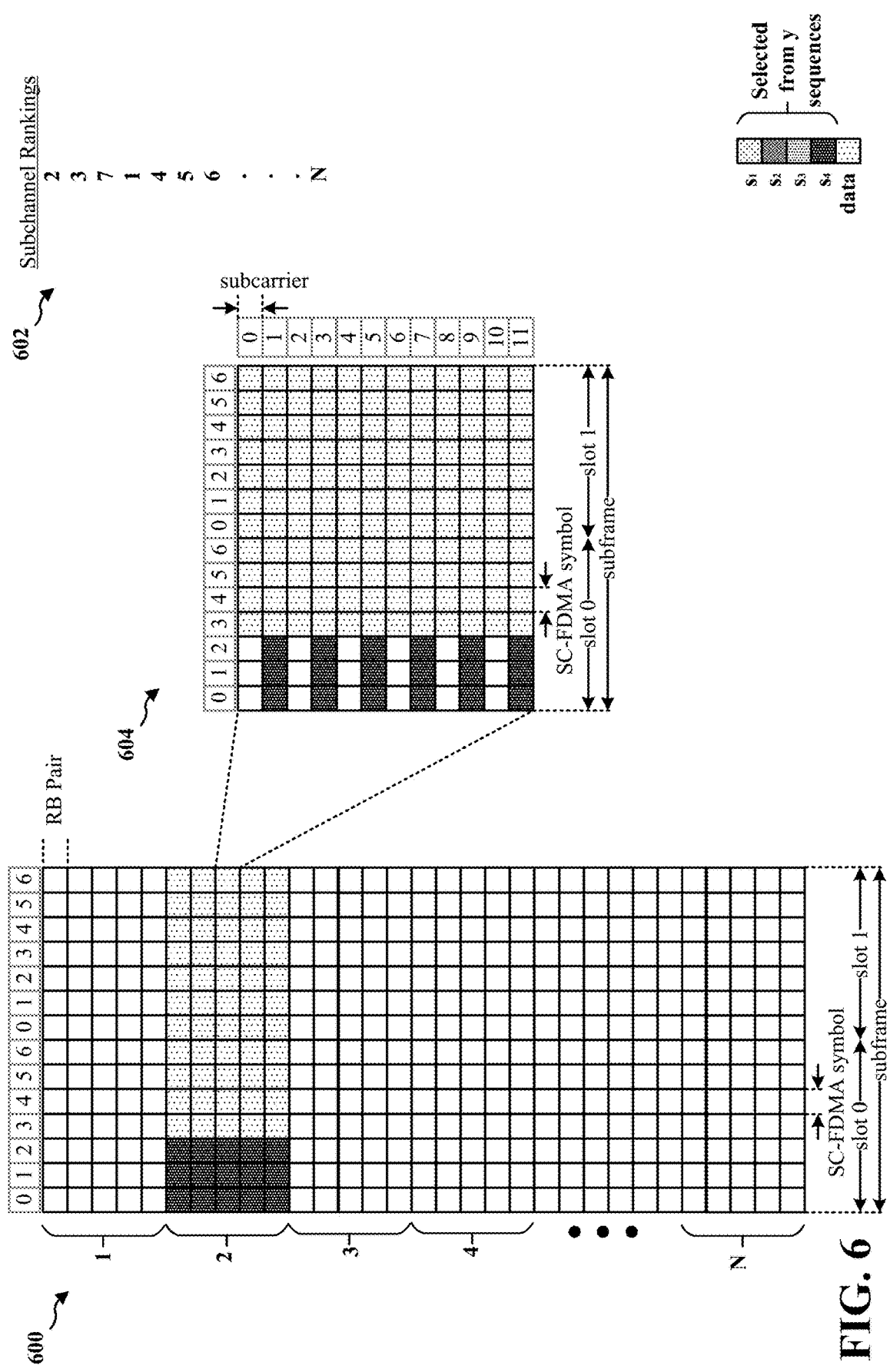
FIG. 6 is a diagram illustrating exemplary TTIs for communication of V2X collision avoidance signaling and data.
Figure 7:
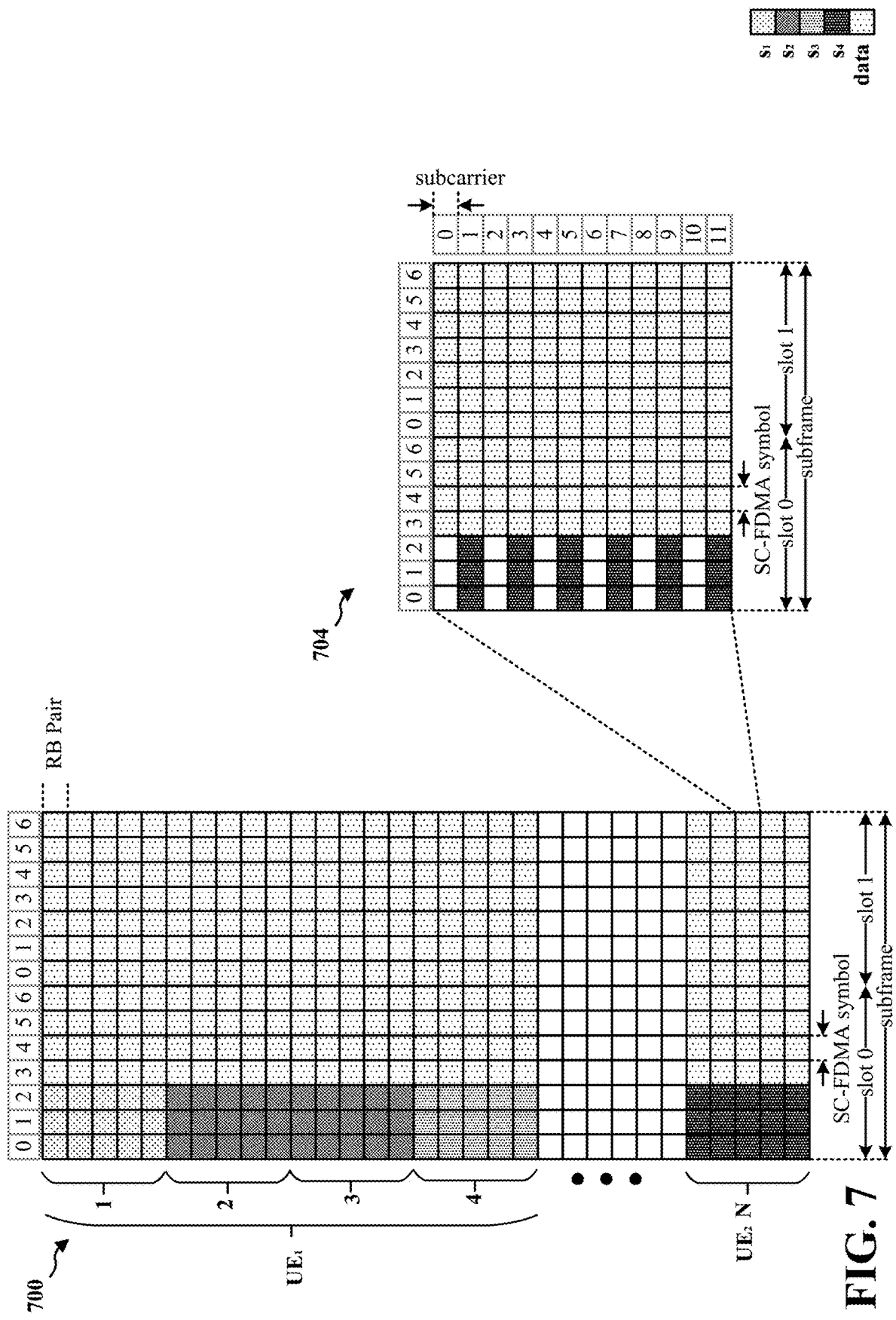
FIG. 7 is a diagram illustrating exemplary transmission time intervals (TTIs) for communication of V2X collision avoidance signaling and data.
Figure 8:
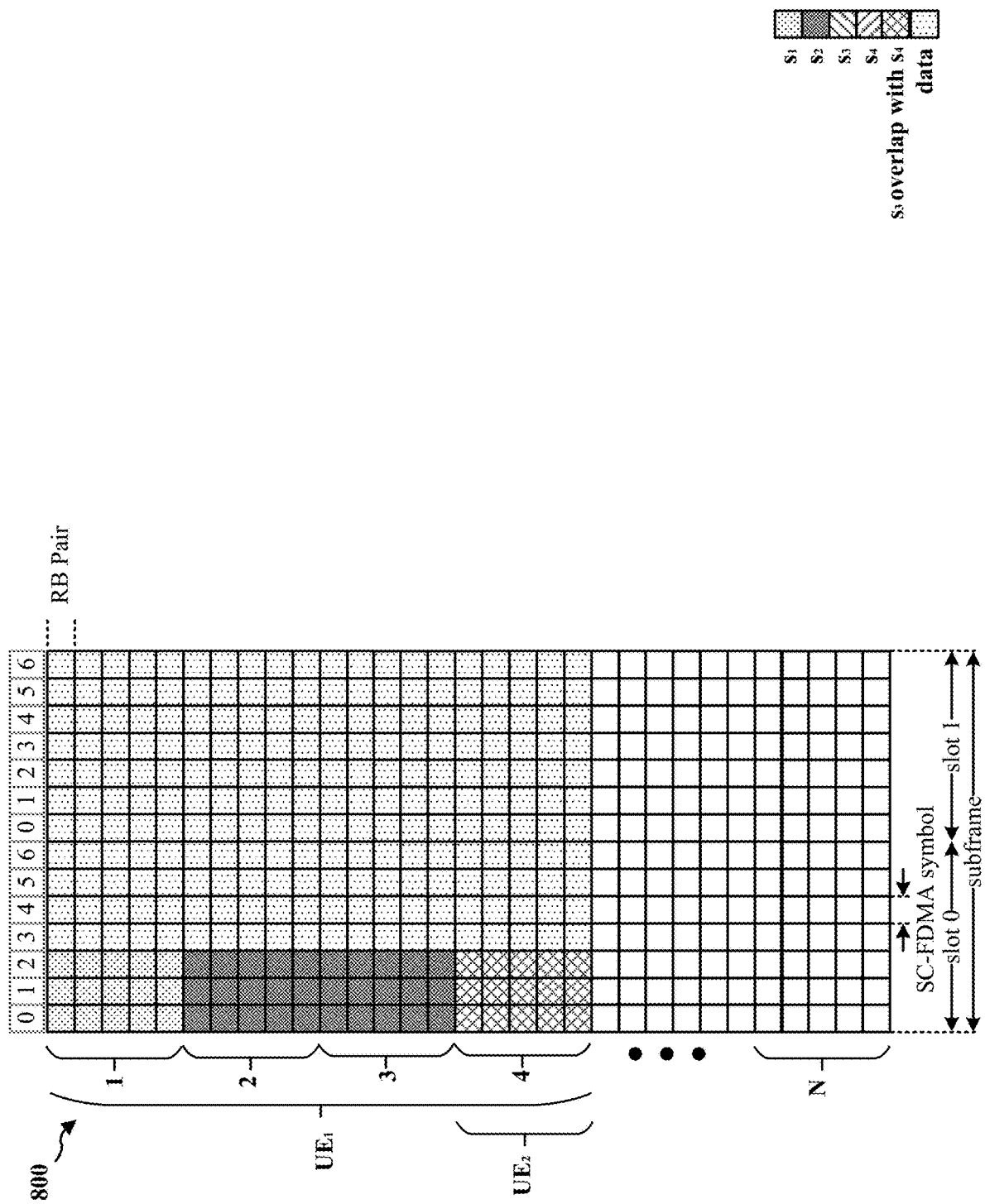
FIG. 8 is a diagram illustrating exemplary transmission time intervals (TTIs) for communication of V2X collision avoidance signaling and data.

FIG. 4 is a flow diagram illustrating an exemplary method of transmitting and receiving data in a set of RB s in at least one subframe, and the at least one subframe may include a first subset of symbols configured for collision avoidance and a second subset of symbols configured for data. FIG. 5 is a first diagram for illustrating an exemplary method and an apparatus for transmission of V2X collision avoidance signaling. FIG. 6 is a second diagram for illustrating an exemplary method and an apparatus for transmission of V2X collision avoidance signaling. FIG. 7 is a first diagram for illustrating an exemplary method and an apparatus for reception of V2X collision avoidance signaling. FIG. 8 is a second diagram for illustrating an exemplary method and an apparatus for reception of V2X collision avoidance signaling.

The flow diagram of FIG. 4 illustrates a wireless communications environment 400. The environment 400 may include a network entity 402 (e.g., a base station 102, a mmW base station 180, and/or another system communicatively coupled with the EPC 160 of FIG. 1). The environment 400 may include at least a first UE 404a, a second UE 404b, and a third UE 406 (e.g., a UE 104 of FIG. 1). The network entity 402 may communicate with one or more of the first UE 404a, the second UE 404b, and/or the third UE 406. In one aspect, the first and second UEs 404a-b, 406 may be transmitting UEs, and the third UE 406 may be a receiving UE (although each of the UEs 404a-b, 406 may be configured as both transmitters and receivers as described herein).

According to an aspect, the network entity 402 may configure communication between at least the UEs 404a-b, 406, including V2X communication. For example, the network entity 402 may configure resources for V2X communication. In an aspect, the network entity 402 may divide a whole system bandwidth into subchannels, which may be of equal size (e.g., the size of each subchannel may be a multiple of 5 RBs). In another aspect, the division of the system bandwidth into subchannels may be preconfigured in the UEs 404a-b, 406.

According to an aspect, the network entity 402 may configure resources on which sequences are to be communicated by UEs (e.g., the first UE 404a). For example, the network entity 402 may configure a first subset of symbols to be used for transmission collision avoidance signaling and/or the network entity 402 may configure a second subset of symbols to be used for data communication. In another aspect, at least one of the first subset of symbols and/or the second subset of symbols may be preconfigured in the UEs 404a-b, 406. In one aspect, the first subset of symbols and the second subset of symbols may be symbols of one subframe. In another aspect, the first subset of symbols and/or the second subset of symbols may span at least two subframes (e.g., two consecutive subframes).

Illustratively, the first subset of symbols may be symbols of a first subframe that includes a first slot and a second slot. The first subset of symbols may include m−i+1 consecutive symbols i, i+1, . . . , m of the first slot, where $0 \leq i \leq m$ and $2 \leq m \leq 6$. Each symbol of the first subset of symbols may be associated with at least one subchannel, and each subchannel configured for the bandwidth may extend across x RBs (e.g., $x \geq 2$). For example, each symbol of the first subset of symbols may be split into at least one subchannel. In one aspect, the number of RBs of a subchannel may be a multiple of 5—e.g., x may be equal to 5(p), where p is an integer greater than or equal to 1.

The network entity 402 may signal configuration information 420 indicating resources configured for communication by the UEs 404a-b, 406 e.g., for V2X communication. For example, the network entity 402 may signal configuration information 420 that indicates at least one of one or more subframes configured to carry information for collision avoidance, the first subset of symbols configured for collision avoidance, the second subset of symbols configured for data communication, a subchannel configuration (e.g., information indicating the number of RBs of a subchannel), and/or any other information related to V2X communication. The network entity 402 may signal the configuration information 420 to at least the first UE 404a and, potentially, the second UE 404b (as well as other UEs).

The first UE 404a may receive the configuration information 420. The first UE 404a may determine 422 to transmit data in a set of RBs in at least one subframe. The data may be associated with V2X communication. In one aspect, the data may be associated with ultra-reliable and low-latency communication (URLLC). In one aspect, the at least one subframe may include a first subset of symbols configured for collision avoidance signaling and a second subset of symbols configured for transmitting data. When the first subset of symbols and/or the second subset of symbols extend across at least two subframes, then the at least two subframes may be consecutive.

In one aspect, the set of RBs may be scheduled by the first UE 404a according to a predetermined criteria (e.g., criteria defined in a standard). In another aspect, the first UE 404a may obtain information indicating the set of RBs from the configuration information 420. Similarly, the first UE 404a may determine the first subset of symbols from a predetermined criteria (e.g., criteria defined in a standard), or the first UE 404a may determine the first subset of symbols from the configuration information 420. Similarly, the first UE 404a may determine the second subset of symbols from a predetermined criteria (e.g., criteria defined in a standard), or the first UE 404a may determine the second subset of symbols from the configuration information 420.

The first UE 404a may determine 424 a subset of symbols of the first subset of symbols within the set of RBs for transmitting at least one concatenated sequence, which may prevent collision with communication by a different UE. For example, the first UE 404a may transmit at least one concatenated sequence in order to indicate that the first UE 404a intends to transmit data during at least a portion of the second subset of symbols.

In an aspect, the first UE 404a may determine (e.g., generate or select) the sequence that is to be transmitted during the determined subset of symbols. In one aspect, the sequence may include one or more ZC sequences or may be based on one or more ZC sequences. In one aspect, one or more sequences may be preconfigured in the first UE 404a. In another aspect, the configuration information 420 may indicate one or more sequences to the first UE 404a.

In an aspect, each subchannel may have associated therewith a plurality of sequences, such as four sequences. The first UE 404a may determine one sequence based on one or more subchannels in which the first UE 404a is to transmit the sequence. For example, the first UE 404a may randomly or pseudo-randomly select a sequence from a set of available sequences that is associated with the one or more subchannels in which the first UE 404a is to transmit the sequence. In another example, the first UE 404a may determine one or more sequences based on an identifier associated with the UE.

In an aspect, the first UE 404a may determine a sequence by concatenated a plurality of subsequences. For example, the first UE 404a may generate a concatenated sequence that includes two or more sequences, which may be subsequences that are each associated with a subchannel of the one or more subchannels.

In one aspect, the first UE 404a may determine at least one of a power or an energy associated with a subchannel. For example, the first UE 404a may listen on one or more REs of one or more subchannels on which the first UE 404a may transmit a sequence. The first UE 404a may rank each of the one or more subchannels based on the at least one power or energy, such as by ranking the one or more subchannels according to the relative power or energy on REs of each subchannel. The first UE 404a may then select a set of the subchannels on which to transmit the sequence based on the ranking.

The first UE 404a may transmit the first sequence 426a in each symbol of the determined subset of symbols within the set of RBs in one or more subframes (e.g., one or more consecutive subframes) in order to indicate that data will be transmitted in a second set of symbols within the set of RBs of the one or more subframes (e.g., one or more consecutive subframes). The first UE 404a may transmit the first sequence 426a in the selected set of subchannels—e.g., the first sequence 426a may span one or more subchannels. In an aspect, the first UE 404a may transmit the first sequence 426a in a comb structure in every other subcarrier associated with each symbol of the determined subset of symbols within the one or more subchannels.

A second UE 404b may similarly transmit a second sequence 426b in symbols within a set of RBs in one or more subframes. In one aspect, the second UE 404b may stagger the second sequence 426b in time relative to the first sequence 426a. A third UE 406 may receive at least the first sequence 426a in the subset of symbol. The third UE 406 may determine 428 the set of RBs on which the first sequence 426a is received. Further, the third UE 406 may determine 428 the set of RBs on which the second sequence 426b is received.

The third UE 406 may determine 430, for the first sequence 426a, that data may be received from the first UE 404a on the determined set of RBs for the first sequence 426a. Similarly, the third UE 406 may determine 430, for the second sequence 426b, that data may be received from the second UE 404b on the determined set of RBs for the second sequence 426b.

The third UE 406 may be configured to reliably detect each sequence that is included in the first sequence 426a in order to begin decoding. However, if the third UE 406 is unable to detect one or more subsequences of the first sequence 426a, the third UE 406 may apply filtering logic in order to reconstruct the full first sequence 426a. For one or more packets with a low-coding rate, the third UE 406 may perform channel estimation in order to decode packets on more than one subchannel; however, the third UE 406 may decode the first sequence 426a on a per-subchannel basis (e.g., a first subsequence may be decoded for a first subchannel, a second subsequence may be decoded for a second subchannel, etc.).

The third UE 406 may estimate individual subsequences when receiving the first sequence 426a, and may combine the estimated subsequences to obtain the first sequence 426a. Accordingly, the third UE 406 may determine 430 an indication of a set of RBs on which the third UE 406 may receive data from the first UE 404a.

In one aspect, the third UE 406 may perform cross-correlation in each of a set of RBs in which the first sequence 426a is received with a known sequence corresponding to the first sequence 426a. For example, the known sequence may be preconfigured in the third UE 406 or received from the network entity 402. The third UE 406 may detect one or more subsequences of the first sequence 426a based on the cross-correlation. Accordingly, the third UE 406 may determine the set of RBs on which the first sequence 426a is received (which may indicate the set of RBs on which data is to be received) based on the cross-correlation.

The first UE 404a may transmit first data 432a on the set of RBs indicated by the first sequence 426a. Correspondingly, the third UE 406 may receive the first data 432a on the set of RBs that are determined 430 by the third UE 406 based on the first sequence 426a. In various aspects, the first UE 404a may transmit the first sequence 426a and the first data 432a in one or more TTIs. For example, the first UE 404a may transmit the first sequence 426a and the first data 432a in two consecutive slots of at least one subframe. In another example, the first UE 404a may transmit the first sequence 426a and the first data 432a in at least two consecutive subframes.

Similarly, the second UE 404b may transmit second data 432b on the set of RBs indicated by the second sequence 426b. Correspondingly, the third UE 406 may receive the second data 432b on the set of RBs that are determined 430 by the third UE 406 based on the second sequence 426b. In various aspects, the second UE 404b may transmit the second sequence 426b and the second data 432b in one or more TTIs. For example, the second UE 404b may transmit the second sequence 426b and the second data 432b in two consecutive slots of at least one subframe. In another example, the second UE 404b may transmit the second sequence 426b and the second data 432b in at least two consecutive subframes.

FIG. 5 illustrates a subframe structure 500 which includes a pair of RBs 504. The subframe structure 500 may be configured for collision avoidance. That is, a subframe may be configured with one set of symbols configured for collision avoidance signal and another set of symbols in the subframe configured for transmission of data.

In some aspects, the bandwidth for transmission may be divided into subchannels. For example, as shown in FIG. 5, the symbols of the subframe structure 500 may be divided into N subchannels. In some aspects, the subchannels may be equal in size. For example, the size of each sub-channel may be 5 RBs (or 60 REs as shown by way of example in FIG. 5. Of course, this is merely exemplary and other sizes of the subchannels may be used. For instance, in some aspects, the subchannels may be a multiple of 5 RBs. The subchannels may extend across multiple RBs. Although two RBs are shown in FIGS. 5-8, this is merely exemplary, for ease of illustration and not limiting. Rather, the N subchannels may extend across more than two RBs.

Multiple different sequences may be used to provide information about the data that will be sent in a next subset of symbols in the subframe. For example, the first UE $404a$ may randomly be assigned a sequence to transmit on one or more of symbols 0-2 of slot 0 for collision avoidance signal. For example, the first UE $404a$ may transmit the assigned sequence beginning with symbol 0, or the first UE $404a$ may transmit the assigned sequence beginning with symbol 2. By transmitting the assigned sequence, the first UE $404a$ may provide an indication that the remaining symbols in the RB pair may include data and control information. In some aspects, the first UE $404a$ may select symbols for transmission of the concatenated sequence based on prior usage, for example. Alternatively, in some aspects, the first UE $404a$ may be preconfigured with the sequences (e.g., sequences $s_1$, $s_2$, $s_3$, and $s_4$). The configuration information (e.g., configuration information 420) may also be received from a network entity (e.g., base station 180, the network entity 402, etc.), for example.

Based on the number of subchannels that the first UE $404a$ is assigned to transmit on, the first UE $404a$ may transmit a different number of concatenated sequences. For example, where the first UE $404a$ transmits on one subchannel, the first UE $404a$ transmits sequence $s_4$ to indicate a stand-alone subchannel. Where the first UE $404a$ transmits on two subchannels, the first UE $404a$ may transmit a sequence $s_1$ to indicate a start subchannel and a sequence $s_3$ indicate an end subchannel. Where the first UE $404a$ transmits on three subchannels, the first UE $404a$ may transmit a sequence $s_1$, a sequence $s_2$ to indicate a middle subchannel, and a sequence $s_3$. Where the first UE $404a$ transmits on four or more subchannels, the first UE $404a$ may transmit a sequence 51, two or more of sequence $s_2$, and sequence $s_3$. The one or more sequences may be an LBT sequence. LBT sequences are collision avoidance mechanisms in which transmitters are able to detect already used RB resources and avoid using such resources for transmission. In some aspects, the sequences may be complex valued sequences such as a ZC sequence. ZC sequences are samples of a complex exponential function given by:

$$ZC_{N_{ZC},M}[k] = \begin{cases} \exp\left(-j\frac{M\pi k^2}{N_{ZC}}\right) & \text{for } N_{ZC} \text{ integer even} \\ \exp\left(-j\frac{M\pi k(k+1)}{N_{ZC}}\right) & \text{for } N_{ZC} \text{ integer odd} \end{cases} \quad \text{Equation 1}$$

Where $N_{ZC}$ is the sequence length and M is the family. ZC sequences have a constant amplitude and have good peak to average power ratio (PAPR) and correlation characteristics.

The sequences may be concatenated or combined and may be presented in consecutive symbols. For example, in subframe structure 500, a sequence $s_1$ spans 3 consecutive symbols of slot 0 (e.g., symbols 0, 1, and/or 2). However, the present disclosure is not so limiting and the concatenated sequence may be greater than or less than three consecutive symbols. For example, the concatenated sequence may include 6 consecutive symbols or may include 2 consecutive symbols.

In some aspects, when the first UE $404a$ is assigned a set of symbols for transmission, the first UE $404a$ may listen on the assigned symbols. Additionally, as shown in 502, the first UE $404a$ may rank the subchannels based on a power or energy of the symbols included in the subchannel. The first UE $404a$ may rank the subchannels based on a likelihood that the subchannel is occupied. In one example, the first UE $404a$ measures or determines a power or energy on a resource element of each symbol in a subchannel. In turn, the first UE $404a$ may rank the subchannels in order of least likely to be occupied based on the power or energy level of the resource elements of each symbol in a subchannel. As shown in FIG. 5, the N subchannels are ranked 502. The first UE $404a$ may determine that subchannels 2, 3, 7, 1 and 4 are least likely to be occupied. In some aspects, the first UE $404a$ may have a preference for contiguous subchannels. As such, the first UE $404a$ may select the top four contiguous subchannels for transmission. As shown in FIG. 5, the first UE $404a$ may transmit on subchannel 1, 2, 3, and 4.

In some aspects, the first UE $404a$ may transmit the sequences (e.g., LBT sequences) on all subcarriers or the first UE $404a$ may transmit the sequences in a comb-like structure as shown in 504. That is, the first UE $404a$ may transmit the sequences in every other subcarrier of each symbol. The first UE $404a$ may transmit the sequence $s_1$ on the odd subcarriers of symbols 0, 1, and/or 2 or on the even subcarriers of symbols 0, 1, and/or 2 as shown for instance in 504. By transmitting the sequence in a comb-like structure, aspects of the present disclosure may beneficially enable automatic gain control (AGC) training at detection Referring to FIG. 6, an exemplary subframe structure 600 is configured with a bandwidth divided into N subchannels. As shown in FIG. 6, the first UE $404a$ may be assigned symbols 0, 1, and/or 2 for transmission. The first UE $404a$ may listen on the assigned symbols. As shown in 602, the first UE $404a$ may rank the subchannels based on a power or energy of the symbols included in the subchannel. The first UE $404a$ may rank the subchannels based on a likelihood that the subchannel is occupied. As shown in FIG. 6, the N subchannels are ranked 602 with subchannel N having the highest determined power or energy. Based on the rankings, the first UE $404a$ may determine that subchannels 2, 3, 7, 1 and 4 are least likely to be occupied. As such, the first UE $404a$ may select the top-ranked subchannel (e.g., the subchannel estimated to be least likely to be occupied, the subchannel on which the lowest energy or power is detected, etc.), subchannel 2 for transmission of the $s_4$ stand-alone sequence.

The first UE $404a$ may transmit the sequences (e.g., LBT sequences) on all subcarriers or the first UE $404a$ may transmit the sequences in a comb-like structure as shown in subframe 604. That is, the first UE $404a$ may transmit the sequences in every other subcarrier of each symbol. The first UE $404a$ may transmit the sequence $s_4$ on the even subcarriers of symbols 0, 1, and/or 2 or on the odd subcarriers of symbols 0, 1, and/or 2 as shown for instance in subframe 604.

Accordingly, the first UE $404a$ may transmit collision avoidance signaling beginning in at least one of symbols 0, 1, and/or 2 the remaining symbols in slot 0 and slot 1 of the subframe structure and possibly subsequent subframes may be used for transmitting data.

By encoding the sequences as described above, the first UE $404a$ may provide an additional transmission status indication. That is, by using the encoded sequences (e.g., sequences $s_1$, $s_2$, $s_3$, and $s_4$), the transmitting first UE 404a may provide a receiving UE (e.g., the third UE 406) an indication of whether an entire transmission has been received or whether additional transmission is expected from the transmitting first UE 404a. Thus, blind detection attempts and detection complexity may be reduced.

Additionally, in some aspects, the first UE 404a may transmit the collision avoidance signaling and data without a pilot signal for the control part. This is, because the sequence may be transmitted in the same antenna port with control part of the data, the sequence may serve as a pilot for channel estimation for control decoding. For instance, as shown in FIG. 6, the first UE 404a may transmit sequence $s_4$ in subchannel 2 of the subframe structure 600. More particularly, the sequence $s_4$ in symbols (e.g., symbols 0, 1, and/or 2 of slot 0) immediately preceding the data (and control information) which is transmitted in symbols 3-6 of slot 0 and symbols 0-6 of slot 1. In another example, the first UE 404a may transmit the sequences $s_1$, $s_2$, $s_3$ in symbols (e.g., symbols 0, 1, and/or 2 of slot 0) immediately preceding the data (and control information) which is transmitted in symbols 3-6 of slot 0 and symbols 0-6 of slot 1, as illustrated in FIG. 5. Accordingly, aspects of the present disclosure may also improve or increase spectral efficiency.

A UE may receive a transmission from one or more other UEs—e.g., the third UE 406 may receive a transmission that includes the first sequence 426a from the first UE 404a. As described above, the transmissions received from the other UEs (e.g., the first and second UEs 404a-b) may include a one or more subframes with a subset of the symbols configured for collision avoidance signal and another subset of symbols including data. As shown in FIGS. 7 and 8, subframe structure 700 includes symbols 0-2 of slot 0 may be configured with a sequence for collision avoidance, data may be received in the remaining symbols of slot 0 and slot 1 (e.g., symbols 3-6 of slot 0 and symbols 0-6 of slot 1.

The bandwidth for reception may be divided into subchannels. For example, as shown in FIGS. 7 and 8, the symbols of the subframe structures 700 and 800 may be divided into N subchannels. In some aspects, the subchannels may be equal in size. For example, the size of each sub-channel may be 5 RBs (or 60 REs) as shown by way of example in FIGS. 7 and 8. Of course, this is merely exemplary and other sizes of the subchannels may be used. For instance, in some aspects, the subchannels may be a multiple of 5 RBs. The subchannels may extend across multiple subframes. Although two RBs are shown in FIGS. 4-8, this is merely exemplary, for ease of illustration and not limiting. Rather, the N subchannels may extend across more than two RBs.

The third UE 406 may receive multiple different sequences that may provide information about the data that will be sent in a next subset of symbols in one or more consecutive subframes. For example, when the number of possible sequences in a subchannel is 4, one sequence ($s_1$) may indicate a start subchannel, one sequence ($s_2$) may indicate a middle subchannel, one sequence ($s_3$) may indicate an end subchannel. Additionally, another sequence ($s_4$) may indicate a stand-alone subchannel. As such, the sequence for a four subchannels allocation may be "start-mid-mid-end" and for a one subchannel allocation may be "alone".

To detect a sequence or portion thereof (e.g., sub-sequence), the third UE 406 may perform a cross-correlation process. In the cross-correlation process, the third UE 406 may compare a received signal with known sequences (e.g., $s_1$, $s_2$, $s_3$, and $s_4$). In some aspects, the third UE 406 may perform the cross-correlation process in the frequency domain by multiplying the received signal in the frequency domain with the conjugate of a known subsequence to get the frequency response. The frequency response may then be converted to time domain channel impulse by computing the fast Fourier transform (FFT). The presence of the known subsequence may be characterized by one or more strong peaks in the impulse response. Thus, the peak of this impulse response may be considered as an estimator. In one example, the third UE 406 may utilize the estimator as an indication of a likelihood that the subchannel includes a known sequence. In a second example, the third UE 406 may compare the estimator to a threshold to get a hard decision. The third UE 406 may select the threshold so as to balance a sensitivity measure with false alarms. The sensitivity scales linearly with the threshold, while the false alarms scale exponentially with the threshold. The false alarm probability is given by $p=\exp(-c_1 T)$ and the misdetection probability is given by $q=1-\exp(-c_2 T)$ which is approximately $c_2 T$ at a target SNR level with $c_1$ and $c_2$ being constant depending on implementation details (e.g., as preconfigured in the third UE 406 or as provided by a network entity). In one exemplary aspect, a desired false alarm may serve as a starting point and may be used to derive the threshold as $-\log(p)/c_1$. Then, the sensitivity may be derived accordingly as $q=-\log(p)*c_2/c_1$.

The third UE 406 may detect each subsequence (e.g., $s_1$, $s_2$ or $s_3$ in subchannels 1-4 of subframe structure 500) independently of other sequences. As such, if there are k possible sequences, the composite false alarm probability or the probability that there is at least one sequence detected given that there is no sequence sent) may be expressed as $p=k*\exp(-c_1 T)$. On the other hand, the mis-detection probability or the probability that a certain sequence is not detected given that it is transmitted may be expressed as $q=1-\exp(-c_2 T)$. So, given a target false alarm probability p, $T=-\log(p/k)/c_1$ and misdetection probability is $q=-\log(p/k)*c_2/c_1$. Accordingly, the third UE 406 may compare the computed false alarm probability and misdetection probability for each sequence (or subsequence) to a threshold value (e.g., 10%). If the computed false alarm probability and misdetection probability for each sequence (or subsequence) are below the threshold value, the third UE 406 may detect a sequence. Otherwise, the third UE 406 may determine that the received information is a false alarm or detection error.

Referring to FIG. 7, the third UE 406 may receive a sequence $s_1$ in symbols 0, 1, and/or 2 of subchannel 1 to indicate that subchannel 1 is the start subchannel for a transmission from the first UE 404a. The third UE 406 may also receive a sequence $s_2$ in symbols 0, 1, and/or 2 of subchannel 2 and subchannel 3 to indicate that subchannels 2 and 3 are both middle subchannels for the transmission from the first UE 404a. The third UE 406 may receive a sequence $s_3$ in symbols 0, 1, and/or 2 of subchannel 4 to indicate that subchannel 4 is an end subchannel for the transmission from first UE 404a.

In some aspects, the third UE 406 may receive a sequence $s_4$ in symbols 0, 1, and 2 of subchannel N to indicate that subchannel N is a stand-alone subchannel for a transmission from the second UE 404b. Based on the received sequences, the third UE 406 may determine that data is to be received in the remaining symbols of the subframe and possibly subsequent subframes on the respective subchannels.

In some aspects, the sequences (e.g., LBT sequences) may be received in a comb-like structure. In the example of FIG. 7, the sequence $s_4$ of channel N is received in a comb-like structure from the second UE 404b. The sequence $s_4$ is received in every other subcarrier of symbols 0, 1, and/or 2 of slot 0 of subframe 704.

In some aspects, the third UE 406 may receive sequences that overlap in a subchannel. For example, as shown in the exemplary subframe structure 800 of FIG. 8, the third UE 406 receives a sequence $s_1$ on subchannel 1, sequence $s_2$ on subchannels 2 and 3, and sequence $s_3$ on subchannel 4 from the first UE 404a. Contemporaneously, the third UE 406 receives a transmission including sequence $s_4$ on subchannel 4 from the second UE 404b. As such, the sequence $s_3$ from the first UE 404a and the sequence $s_4$ from the second UE 404b overlap. However, because the sequences (e.g., $s_3$ and $s_4$) associated with the respective transmissions are orthogonal, the third UE 406 may detect each of the sequences from the first UE 404a and the second UE 404b in order to determine RBs on which data is to be received from each of the first UE 404a and the second UE 404b. The third UE 406 may then receive the associated data based on the determined RBs.

Figure 9:
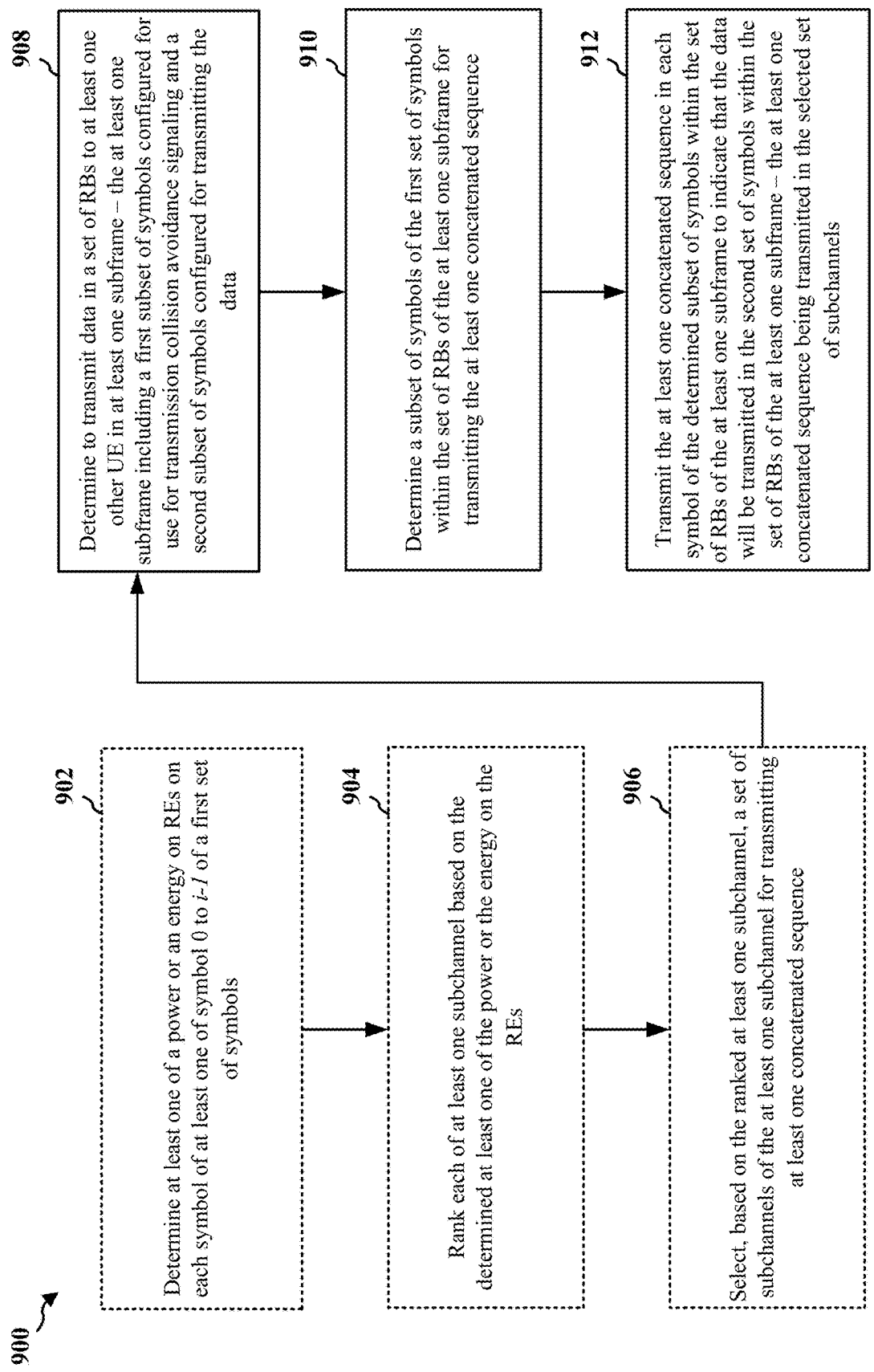
FIG. 9 is a flowchart of an exemplary method of wireless communication.

FIG. 9 is a flowchart 900 of a method of wireless communication. The method may be performed by a UE (e.g., the UE 104, the first UE 404a, the second UE 404b, the apparatus 1102/1102'). In different aspects, one or more of the illustrated operations may be optional, transposed, and/or contemporaneously performed.

Beginning with operation 902, the UE may determine one or more of a power or an energy on REs of each symbol of a first set of symbols. For example, the UE may monitor REs of each symbol of a first set of symbols, and the UE may measure power and/or energy on those REs. In the context of FIGS. 4-8, the first UE 404a may determine one or more of a power or an energy on REs of each symbol of a first set of symbols.

At operation 904, the UE may rank each of one or more subchannels. The subchannels may be ranked based on the determined power or energy of the REs included in each subchannel. For example, the UE may compare each determined power and/or energy for RE(s) of each subchannel to determined powers and/or energies for REs of other subchannels, and the UE may determine a ranking of each subchannel relative to the other subchannels based on the comparison. As shown for example in FIGS. 4-6, the first UE 404a may rank each of the N subchannels (502, 602) based on powers and/or energies measured by the first UE 404a on RE(s) of each of the N subchannels.

At operation 906, the UE may select, based on the ranked one or more subchannels, a set of subchannels of the at least one subchannel for transmitting at least one concatenated sequence. As shown in FIGS. 4-6, having ranked the subchannels based on the power or energy of the REs, the first UE 404a may select subchannels 1, 2, 3, and 4 for transmitting one or more sequences. Although subchannel 7 has a higher rank than subchannels 1 and 4, subchannel 1 and 4 may be selected based on a preference of the first UE 404a for contiguous subchannels, for example.

At operation 908, the UE determines to transmit data in a set of RBs to at least one other UE in at least one subframe. For example, the UE may determine that the UE is to transmit data (e.g., V2X data) to another UE, and the UE may schedule the determined data for transmission. In aspects, the at least one subframe may include a first subset of symbols configured for use for transmission collision avoidance signaling and a second subset of symbols configured for transmitting the data. For example, as shown in FIGS. 4-5, the first UE 404a may determine 422 to transmit data in a set of RBs in at least one subframe. The first UE 404a may be assigned (e.g., randomly and/or based on configuration information 420) a sequence to transmit on one or more of symbols 0-2 of slot 0 for collision avoidance. In some aspects, the first UE 404a may determine that there is data to be transmitted to another UE (e.g., the third UE 406). The first UE 404a may configure a first subset of symbols in a subframe for collision avoidance signal and determine to transmit the data in the second subset of symbols.

At operation 910, the UE determines a subset of symbols of the first set of symbols within the set of RBs of the at least one subframe for transmitting at least one concatenated sequence. For example, the UE may receive configuration information from a network entity, and the UE may identify the subset of symbols from the configuration information. In an aspect, the UE may determine the configuration of the concatenated sequences via an indication received from the network. In another aspect, the UE may determine the configuration of the concatenated sequences based on information that is preconfigured in the UE. As shown in FIGS. 4-6, the first UE 404a may determine 424 a subset of symbol of at least subframe for transmitting at least one concatenated sequence. The first UE 404a may be configured with symbols 0-2 with one or more concatenated sequences for collision avoidance. The first UE 404a may also configure the remaining symbols in slot 0 (e.g., symbols 3-6) and slot 1 (e.g., symbols 0-6), as well as symbols in a subsequent subframe for transmitting data.

At operation 912, the UE transmits the at least one concatenated sequences in each symbol of the determined subset of symbols within the set of RBs of the at least one subframe to indicate that the data will be transmitted in the second set of symbols within the set of RBs of the at least one subframe. As shown in FIGS. 4-6, the first UE 404a may transmit the first concatenated sequence 426a. For example, the first UE 404a may transmit one or more sequences (e.g., $s_1$, $s_2$, $s_3$, and $s_4$) in symbols 0, 1, and/or 2 of a subframe structure (500, 600). Each of the sequences may indicate that the first UE 404a may transmit data in the remaining symbols (e.g., symbols 3-6 of slot 0 and symbols 0-6 of slot 1) of the subframe, and potentially in one or more subsequent subframes.

Figure 10:
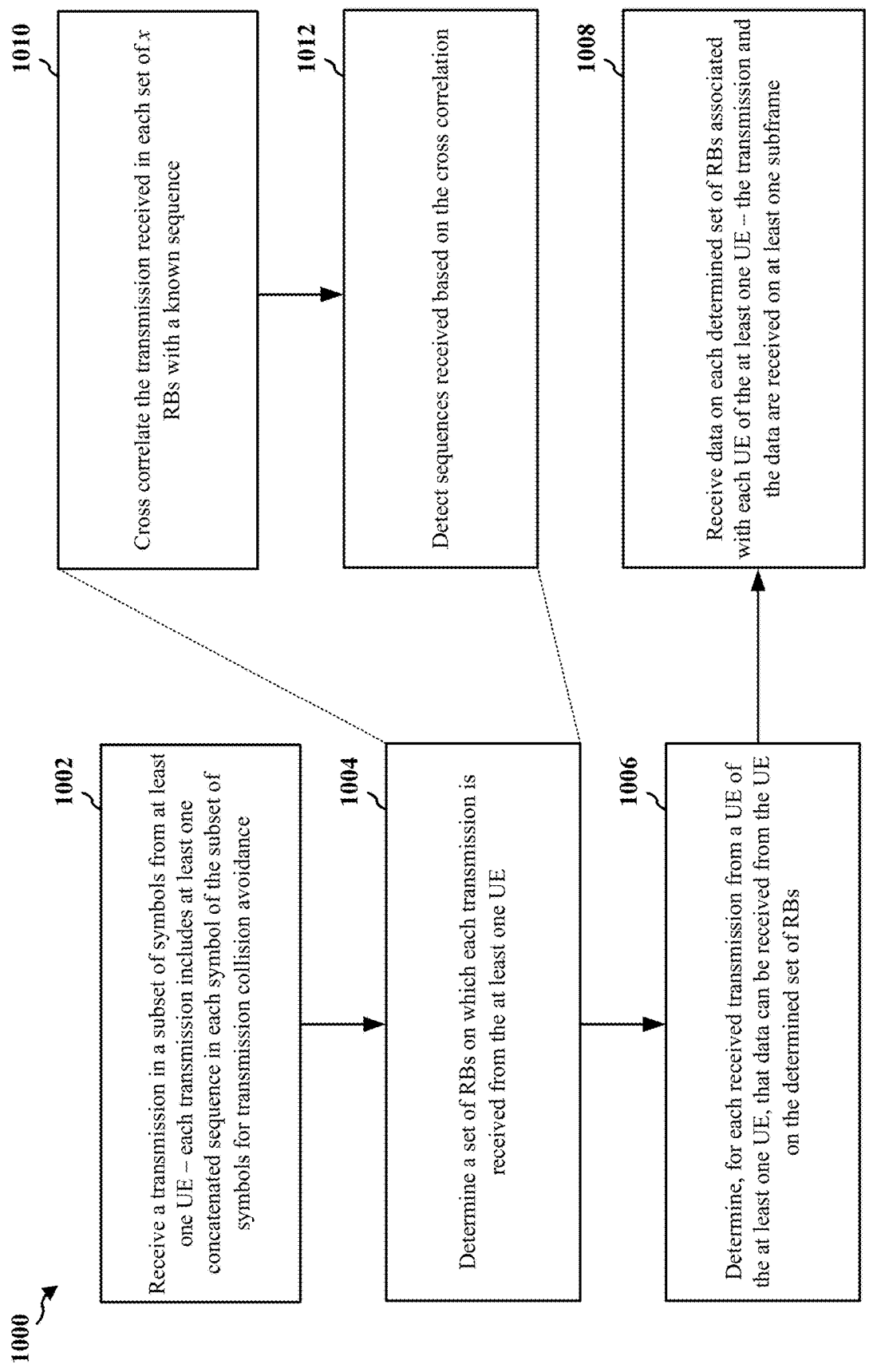
FIG. 10 is a flowchart of an exemplary method of wireless communication.

FIG. 10 is a flowchart 1000 of a method of wireless communication. The method may be performed by a UE (e.g., the UE 104, the third UE 406, the apparatus 1102/1102'). In different aspects, one or more of the illustrated operations may be optional, transposed, and/or contemporaneously performed.

At operation 1002, the UE receives a transmission in a subset of symbols from at least one UE. Each transmission in the subset of symbols includes at least one concatenated sequences in each symbol of the subset of symbols for transmission collision avoidance. As shown in FIGS. 4 and 7, the third UE 406 may receive transmission(s) from the first UE 404a and/or the second UE 404b. For example, the first UE 404a may transmit the first sequence 426a, to be received by the third UE 406, and the second UE 404b may transmit the second sequence 426b, to be received by the third UE 406. The symbols 0-2 of slot 0 of subframe structure 700 may be used for transmitting concatenated sequences for collision avoidance. In the example of FIG. 7, symbols 0, 1, and 2 of slot 0 of subframe structure 700 may be used to transmit one or more of four sequences (e.g., $s_1$, $s_2$, $s_3$, and $s_4$). UE$_2$ transmits sequences $s_4$ in symbols 0, 1, and 2. The sequence $s_4$ provides an indication that the transmission received is a standalone transmission. Thus, the third UE 406 may expect that it has received a complete transmission in one subchannel, and the third UE 406 may refrain from searching for additional data in other (e.g., adjacent) subchannels. On the other hand, in symbols 0, 1, and/or 2, the third UE 406 receives a transmission from the first UE 404*a* including one sequence $s_1$, two of sequence $s_2$ and one sequence $s_3$. The sequence $s_1$ may indicate a start of a transmission. The sequence $s_2$ may indicate a middle portion of a transmission, and thus may also indicate that further portions of the transmission should be expected. Additionally, the sequence $s_2$ may provide an indication that another portion of the transmission (e.g., in another subchannel) was sent, which may inform the receiving third UE 406 of a possible missed transmission. The sequence $s_3$ may indicate the end of a transmission. As such, the third UE 406 may be apprised that no further portion of transmission(s) should be expected from the first UE 404*a*, for example.

At operation 1004, the UE determines a set of RBs on which each transmission is received from the at least one UE. The UE may decode a signal received in a receive Rx path. The decoded signal may be sampled to detect one or more concatenated sequences. In the context of FIG. 4, for example, the third UE 406 may determine 428 a set of RBs on which the first sequence 426*a* is received.

In some aspects, operation 1004 may include operation 1010 and operation 1012. At operation 1010, the UE may cross-correlate the transmission received in each set of RBs with a known sequence. For example, the UE may detect one or more subsequences of the received transmission, and then the UE may compare the one or more detected subsequences to one or more corresponding known sequences (e.g., as preconfigured in the UE or received from a network entity). As shown in FIGS. 4 and 7, the third UE 406 may compare each sequence received in symbols 0, 1, and 2 of slot 0 (see subframe structure 700) with each of the four known sequences (e.g., $s_1$, $s_2$, $s_3$, and $s_4$).

Accordingly, at operation 1012, the UE may detect sequences received based on the cross-correlation. For example, the UE may determine whether a detected subsequence matches a known subsequence based on the cross-correlation, and when the detected subsequence matches the known subsequence, the UE may detect a sequence (e.g., a subsequence of a concatenated sequence). As shown in FIGS. 4 and 7, having compared the sequence received in symbols 0, 1 and 2 of slot 0 (see subchannel N) with each of the sequences $s_1$, $s_2$, $s_3$, and $s_4$, the third UE 406 may determine that sequence $s_4$ matches the received sequence and thus, detect sequence $s_4$.

At operation 1006, the UE determines for each received transmission from a UE of the at least one UE, that data may be received from the UE on the determined set of RBs. For example, the UE may schedule the UE to monitor the determined set of RBs, and the UE may monitored the determined set of RBs according to the scheduling. As shown in to FIGS. 4 and 7, the third UE 406 may determine 430 a set of RBs on which data may be received from the first UE 404*a* and/or the second UE 404*b*. For example, having detected sequence $s_4$ in symbols 0, 1, and 2 of slot 0 of the RB pair in subframe structure 700 from the second UE 404*b*, the third UE 406 may decode the sequence to determine that sequence $s_4$ indicates a stand-alone transmission. As such, the third UE 406 may receive an indication that the remaining symbols in the RB pairs (see subchannel N) include data from the second UE 404*b*.

At operation 1008, the UE receives data on each determined set of RBs associated with each UE of the at least one UE. The transmission and the data are received on at least one subframe. As shown in FIGS. 4-7, having identified and decoded $s_4$ sequence, and determined that data can be received in symbols 3-6 of slot 0 and symbols 0-6 of slot 1 for the RB pair of subframe structure 700, the third UE 406 may receive the data.

Figure 11:
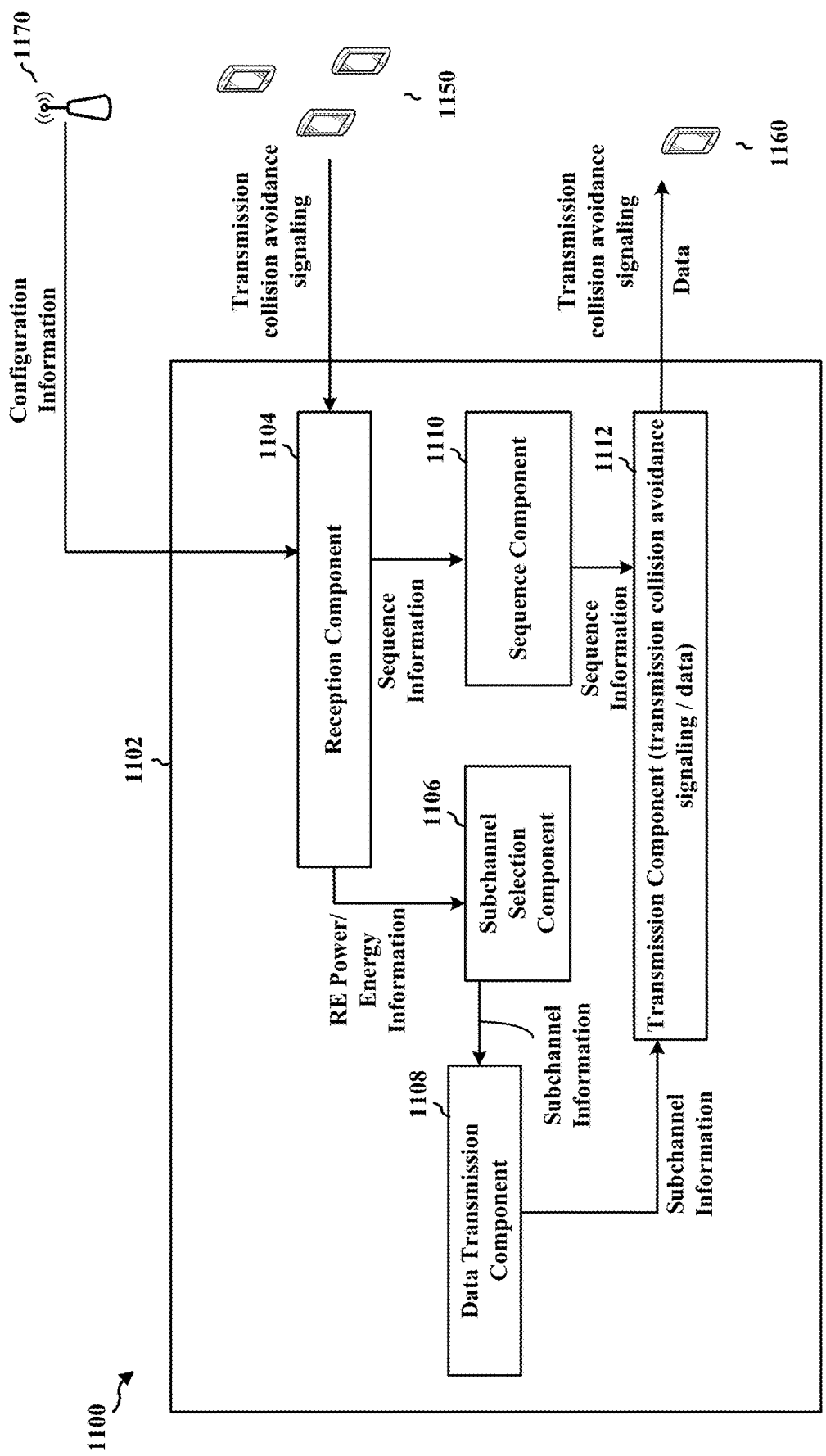
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE. The apparatus includes a reception component 1104 that receives transmissions collision avoidance signaling and data from one or more other UEs 1150, a subchannel selection component 1106 that selects subchannels for transmitting one or more sequences for collision avoidance along with data based on power or energy information for REs in the potential subchannels, and a data transmission component 1108 that configures the selected subchannels for transmission of the data. The apparatus further includes a sequence component 1110 to supply the sequence information for used for collision avoidance and a transmission component 1112 that receives the subchannel information and sequence information and transmits collision avoidance signaling and data to another UE 1160.

The reception component 1104 may receive configuration information from a network entity 1170. The configuration information may indicate information associated with transmission collision avoidance signaling. For example, the configuration information may indicate one or more sequences, each of which may be associated with at least one subchannel. The indicated one or more sequences may be subsequences of a concatenated sequence. In some aspects, the configuration information may be preconfigured in the apparatus 1102.

In some aspects, the data transmission component 1108 may determine to transmit data in a set of RBs to at least one other UE 1160, and the at least one subframe may include a first subset of symbols configured for use for transmission collision avoidance signaling and a second subset of symbols configured for transmitting data.

The sequence component 1110 may determine a subset of symbols of the first subset of symbols of the first subset of symbols within the set of RBs of the at least one subframe for transmitting at least one concatenated sequence. The sequence component 1110 may further determine at least one concatenated sequence for transmission collision avoidance signaling.

The transmission component 1112 may transmit the at least one concatenated sequence in each symbol of the determined subset of symbols within the set of RBs of the at least one subframe to indicate that data will be transmitted in the second subset of symbols within the set of RBs of the at least one subframe.

The data transmission component 1108 may determine data to be transmitted to the at least one other UE 1160. The transmission component 1112 may transmit the determined data in the second subset of symbols within the set of RBs of the at least one subframe.

In one aspect, the subchannel selection component 1106 may determine at least one of a power or an energy on REs of one or more symbols of the first subset of symbols. The subchannel selection component 1106 may then rank each of the at least one subchannel based on the determined at least one of the power or the energy on the REs. The subchannel selection component 1106 may select, based on the ranked at least one subchannel, a set of subchannels of the at least one subchannel for transmitting the at least one concatenated sequence.

The data transmission component 1108 may schedule the at least one concatenated sequence and/or the data based on the selected set of subchannels. The transmission component 1112 may transmit the at least one concatenated sequence and/or the data on the selected set of subchannels.

The apparatus may include additional components that perform each of the blocks of the algorithm in the aforementioned methods of FIGS. 4, 9, and/or 10. As such, each block in the aforementioned methods of FIGS. 4, 9, and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
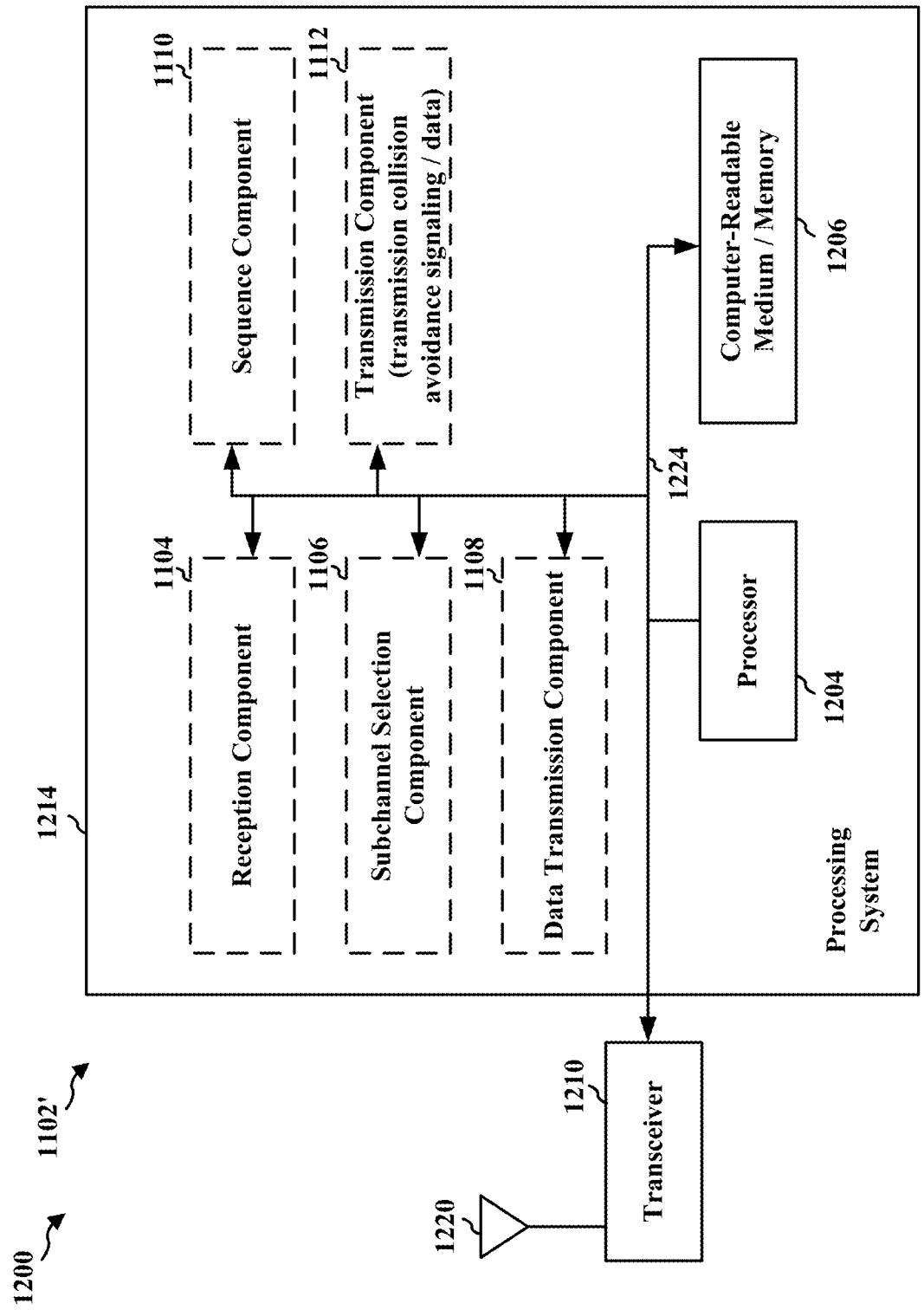
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, or 1112. The components may be software components running in the processor 1204, resident/stored in the computer readable medium/memory 1206, one or more hardware components coupled to the processor 1204, or some combination thereof. (Include if invention resides in base station) The processing system 1214 may be a component of the base station 310 and may include the memory 376 and/or at least one of the TX processor 316, the RX processor 370, and the controller/processor 375. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for determining to transmit data in a set of RBs to at least one other UE in at least one subframe, the at least one subframe including a first subset of symbols configured for use for transmission collision avoidance signaling and a second subset of symbols configured for transmitting the data. The apparatus 1102/1102' includes means for determining a subset of symbols of the first subset of symbols within the set of RBs of the at least one subframe for transmitting at least one concatenated sequence. The apparatus 1102/1102' includes means for transmitting the at least one concatenated sequence in each symbol of the determined subset of symbols within the set of RBs of the at least one subframe to indicate that the data will be transmitted in the second subset of symbols within the set of RBs of the at least one subframe.

In an aspect, a first subframe of the at least one subframe includes a first slot and a second slot, and the determined subset of symbols includes m−i+1 consecutive symbols i, i+1, . . . , m of the first slot, where $0 \le i \le m$ and $2 \le m \le 6$. In an aspect, each symbol of the first subset of symbols is associated with at least one subchannel, each of the at least one subchannel extends across x RBs, and each sequence of the at least one concatenated sequence is transmitted within a different subchannel in each symbol of the determined subset of symbols of the at least one subframe. In an aspect, $x \ge 2$. In an aspect, $x=p5$, where p is an integer greater than or equal to one. In an aspect, each sequence of the at least one concatenated sequence is transmitted in a comb structure in every other subcarrier of each symbol of the determined subset of symbols within the different subchannel of the at least one subframe. In an aspect, each sequence of the at least one concatenated sequence has length equal to 6x. In an aspect, $i \ge 1$, and the apparatus 1102/1102' may further include: means for determining at least one of a power or an energy on REs on each symbol of at least one of symbol 0 to i−1 of the first subset of symbols; means for ranking each of the at least one subchannel based on the determined at least one of the power or the energy on the REs; and means for selecting, based on the ranked at least one subchannel, a set of subchannels of the at least one subchannel for transmitting the at least one concatenated sequence, the at least one concatenated sequence being transmitted in the selected set of subchannels. In an aspect, each sequence of the at least one concatenated sequence is one of y sequences, where $y \ge 4$. In an aspect, a first sequence of the y sequences is sequence $s_1$, a second sequence of the y sequences is sequence $s_2$, a third sequence of the y sequences is sequence $s_3$, and a fourth sequence of the y sequences is sequence $s_4$. In an aspect, the at least one concatenated sequence comprises z concatenated sequences, and the z concatenated sequences comprise one $s_1$ sequence, n $s_2$ sequences, and one $s_3$ sequence when $z=2+n$, for $n \ge 0$. In an aspect, the at least one concatenated sequence comprises one sequence, and the one sequence is the $s_4$ sequence. In an aspect, $s_1$, $s_2$, $s_3$, and $s_4$ are selected from first, second, third, and fourth sets of sequences, respectively, the selection being random or based on an identifier of the UE. In an aspect, the y sequences are preconfigured in the UE. In an aspect, the apparatus 1102/1102' may include means for receiving a configuration of the y sequences. In an aspect, each sequence of the at least one concatenated sequence is a Zadoff-Chu sequence.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
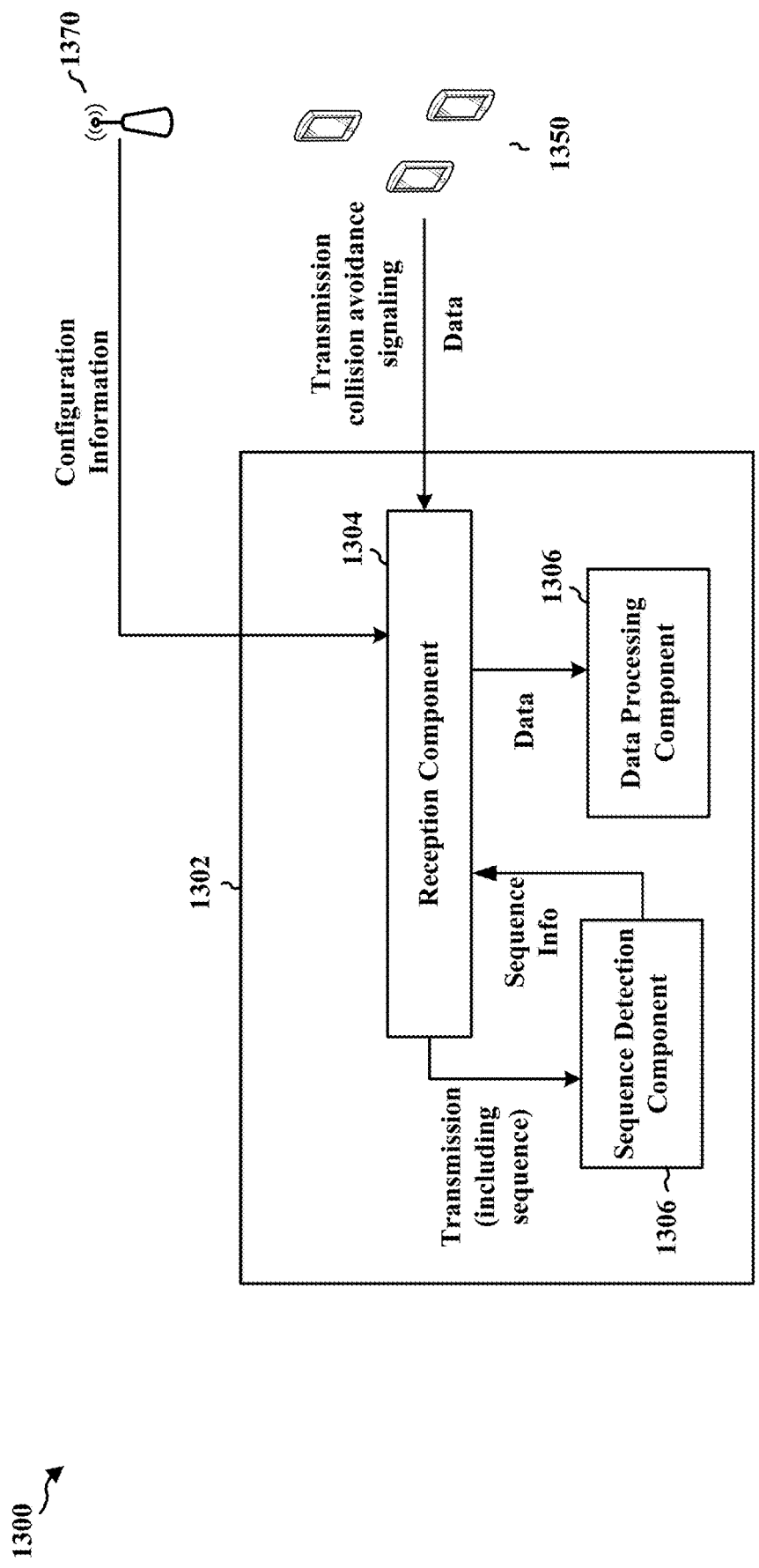
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE. The apparatus includes a component 1304 that receives transmissions collision avoidance signaling and data from one or more other UEs 1350 and a sequence detection component 1306 that performs a cross correlation process to detect one or more known sequences. The sequence detection component 1306 also supplies the detected sequence information to the reception component 1304 such that the data may be received. The reception component 1304 may receive data based on the detected sequence information, and supply the data to the data processing component 1308, e.g., for decoding.

The reception component 1304 may receive configuration information from a network entity 1370. The configuration information may indicate information associated with transmission collision avoidance signaling. For example, the configuration information may indicate one or more sequences, each of which may be associated with at least one subchannel. The indicated one or more sequences may be subsequences of a concatenated sequence. In some aspects, the configuration information may be preconfigured in the apparatus 1302.

In aspects, the reception component 1304 may receive a transmission from at least one other UE 1350. The transmission may be received in a subset of symbols. The transmission may include at least one concatenated sequence in each symbol of the subset of symbols for transmission collision avoidance signaling.

The sequence detection component 1306 may determine a set of RBs on which each transmission is received from the at least one other UE 1350. For example, the sequence detection component 1306 may determine, for each received transmission from a UE of the at least one other UE 1350, that data can be received from the UE on the determined set of RBs. In an aspect, the sequence detection component 1306 may perform cross-correlation of the transmission received from the at least one other UE 1350 received in a set of RBs with a known sequence (e.g., the known sequence may be indicated in the configuration information). The sequence detection component 1306 may detect sequences received based on the cross-correlation. The sequence detection component 1306 may indicate, to the reception component 1304, the set of RBs on which the transmission is received from the at least one other UE 1350 based on the detected sequence(s), e.g., in order to indicate a set of RBs on which data may be received.

The reception component 1304 may monitor RBs corresponding to the set of RBs on which data may be received, as supplied by the sequence detection component 1306. The reception component 1304 may receive data on the monitored RBs from the at least one other UE 1350. The reception component 1304 may supply the received data to the data processing component 1308. The data processing component 1308 may process the data supplied by the reception component 1304—e.g., the data processing component 1308 may decode the data supplied by the reception component 1304.

The apparatus may include additional components that perform each of the blocks of the algorithm in the aforementioned methods of FIGS. 4, 9, and/or 10. As such, each block in the aforementioned methods of FIGS. 4, 9, and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
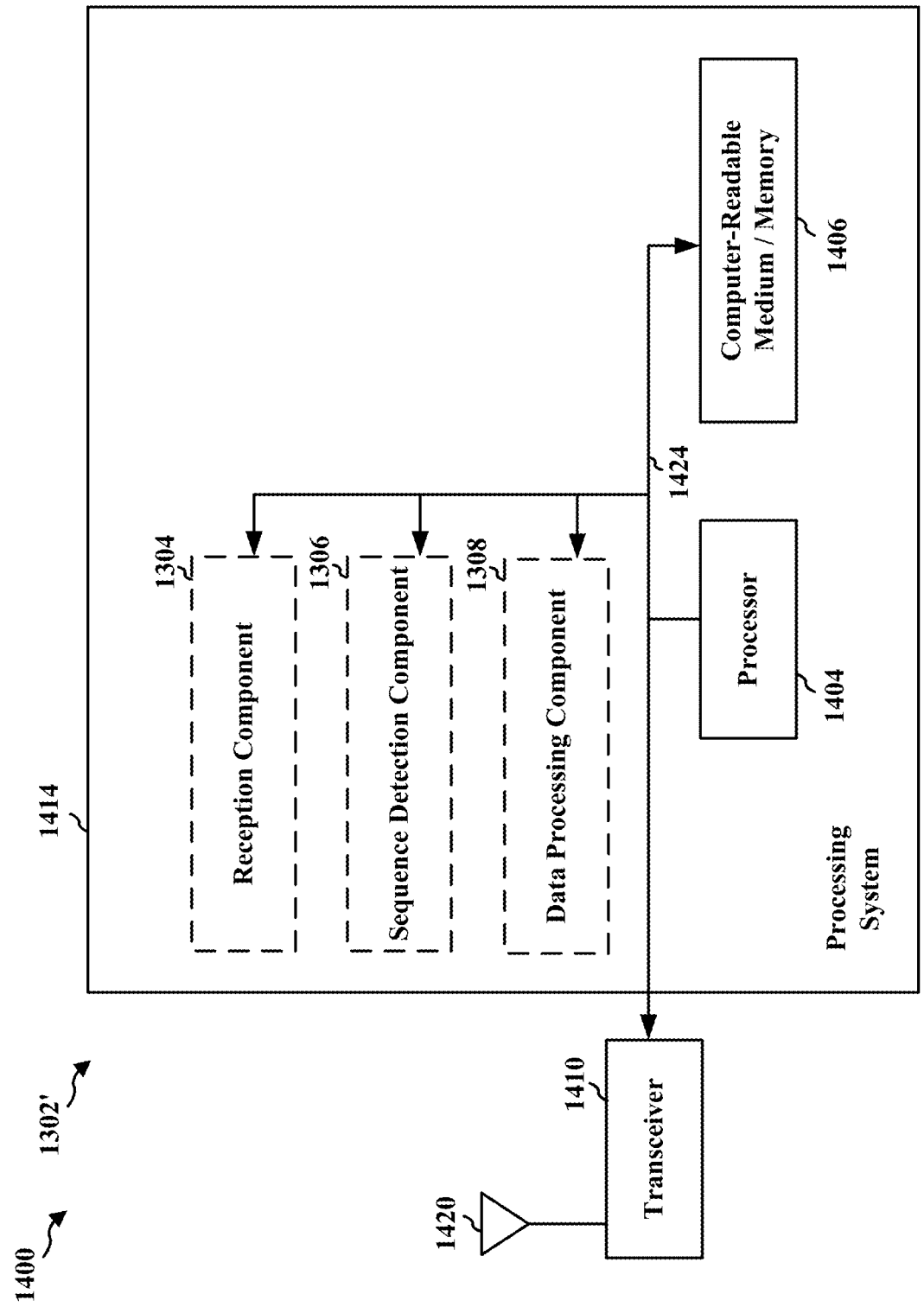
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304 or 1306. The components may be software components running in the processor 1404, resident/stored in the computer readable medium/memory 1406, one or more hardware components coupled to the processor 1404, or some combination thereof. (Include if invention resides in base station) The processing system 1414 may be a component of the base station 310 and may include the memory 376 and/or at least one of the TX processor 316, the RX processor 370, and the controller/processor 375. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving a transmission in a subset of symbols from at least one UE, each transmission including at least one concatenated sequence in each symbol of the subset of symbols for transmission collision avoidance signaling. The apparatus 1302/1302' includes means for determining a set of RBs on which each transmission is received from the at least one UE. The apparatus 1302/1302' includes means for receiving data on each determined set of RBs associated with each UE of the at least one UE, the transmission and the data being received on at least one subframe.

In an aspect, the apparatus 1302/1302' further includes means for determining, for each received transmission from a transmitting UE of the at least one UE, that the data is to be received from the transmitting UE on the determined set of RBs. In an aspect, a first subframe of the at least one subframe includes a first slot and a second slot, and the subset of symbols includes m−i+1 consecutive symbols i, i+1, . . . , m of the first slot, where 0≤i≤m and 2≤m≤6. In an aspect, each symbol of the subset of symbols is associated with at least one subchannel, each of the at least one subchannel extends across x RBs, and each sequence of the at least one concatenated sequence from an $i^{th}$ $UE_i$ of the at least one UE is received in each symbol of the subset of symbols within a different subchannel of the at least one subframe. In an aspect, x≥2. In an aspect, x=p5, where p is an integer greater than or equal to one. In an aspect, each sequence of the at least one concatenated sequence from the $i^{th}$ $UE_i$ of the at least one UE is received in a comb structure in every other subcarrier of each symbol of the subset of symbols within a different set of x RBs of the at least one subframe. In an aspect, each sequence of the at least one concatenated sequence has length equal to 6x. in an aspect, the at least one UE comprises a plurality of UEs, and the at least one concatenated sequence from each UE of the plurality of UEs at least partially overlap in each symbol of the subset of symbols by ax RBs, where a is an integer greater than zero. In an aspect, the means for determining the set of RBs on which each transmission is received from the at least one UE is configured to cross correlate the transmission received in each set of x RBs with a known sequence; and detect sequences received based on the cross correlation, wherein the set of RBs on which each transmission is received from the at least one UE is determined based on the detected sequences. In an aspect, each sequence of the at least one concatenated sequence is one of y sequences, where y≥4. In an aspect, a first sequence is sequence s1, a second sequence is sequence s2, a third sequence is sequence s3, and a fourth sequence is sequence s4, and wherein the at least one concatenated sequence from the $i^{th}$ $UE_i$ of the at least one UE comprises $z_i$ concatenated sequences, and the $z_i$ concatenated sequences comprise: one $s_4$ sequence when $z_i$=1; and one $s_1$ sequence, n $s_2$ sequences, and one $s_3$ sequence when $z_i$=2+n, for n≥0. In an aspect, each sequence of the at least one concatenated sequence for each UE of the at least one UE is a Zadoff-Chu sequence.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving a transmission in a subset of symbols from at least one UE, each transmission including at least one concatenated sequence in each symbol of the subset of symbols for transmission collision avoidance signaling;
   determining a set of resource blocks (RBs) on which each transmission is received from the at least one UE; and
   receiving data on each determined set of RBs associated with each UE of the at least one UE, the transmission and the data being received on at least one subframe;
   wherein each symbol of the subset of symbols is associated with at least one subchannel, each of the at least one subchannel extends across x RBs, and each sequence of the at least one concatenated sequence from an $i^{th}$ $UE_i$ of the at least one UE is received in each symbol of the subset of symbols within a different subchannel of the at least one subframe.

2. The method of claim 1, further comprising determining, for each received transmission from a transmitting UE of the at least one UE, that the data is to be received from the transmitting UE on the determined set of RBs.

3. The method of claim 1, wherein a first subframe of the at least one subframe includes a first slot and a second slot, and the subset of symbols includes m−i+1 consecutive symbols i, i+1, . . . , m of the first slot, where 0≤i≤m and 2≤m≤6.

4. The method of claim 1, wherein x≥2.

5. The method of claim 4, wherein x=p5, where p is an integer greater than or equal to one.

6. The method of claim 1, wherein each sequence of the at least one concatenated sequence from the $i^{th}$ $UE_i$ of the at least one UE is received in a comb structure in every other subcarrier of each symbol of the subset of symbols within a different set of x RBs of the at least one subframe.

7. The method of claim 1, wherein each sequence of the at least one concatenated sequence has length equal to 6x.

8. The method of claim 1, wherein the at least one UE comprises a plurality of UEs, and the at least one concatenated sequence from each UE of the plurality of UEs at least partially overlap in each symbol of the subset of symbols by ax RBs, where a is an integer greater than zero.

9. The method of claim 1, wherein the determining the set of RBs on which each transmission is received from the at least one UE comprises:
   cross correlating the transmission received in each set of x RBs with a known sequence; and
   detecting sequences received based on the cross correlation,
   wherein the set of RBs on which each transmission is received from the at least one UE is determined based on the detected sequences.

10. The method of claim 1, wherein each sequence of the at least one concatenated sequence is one of y sequences, where y≥4.

11. The method of claim 10, wherein a first sequence is sequence $s_1$, a second sequence is sequence $s_2$, a third sequence is sequence $s_3$, and a fourth sequence is sequence $s_4$, and wherein the at least one concatenated sequence from an $i^{th}$ $UE_i$ of the at least one UE comprises $z_i$ concatenated sequences, and the $z_i$ concatenated sequences comprise:
   one $s_4$ sequence when $z_i=1$; and
   one $s_1$ sequence, n $s_2$ sequences, and one $s_3$ sequence when $z_i=2+n$, for n≥0.

12. The method of claim 1, wherein each sequence of the at least one concatenated sequence for each UE of the at least one UE is a Zadoff-Chu sequence.

13. An apparatus of wireless communication of a user equipment (UE), comprising:
   a memory; and
   at least one processor coupled to the memory, the at least one processor being configured to:
      receive a transmission in a subset of symbols from at least one UE, each transmission including at least one concatenated sequence in each symbol of the subset of symbols for transmission collision avoidance;
      determine a set of resource blocks (RBs) on which each transmission is received from the at least one UE; and
      receive data on each determined set of RBs associated with each UE of the at least one UE, the transmission and the data being received on at least one subframe;
      wherein each symbol of the subset of symbols is associated with at least one subchannel, each of the at least one subchannel extends across x RBs, and each sequence of the at least one concatenated sequence from an $i^{th}$ $UE_i$ of the at least one UE is received in each symbol of the subset of symbols within a different subchannel of the at least one subframe.

14. The apparatus of claim 13, wherein the at least one processor is further configured to determine, for each received transmission from a transmitting UE of the at least one UE, that the data is to be received from the transmitting UE on the determined set of RBs.

15. The apparatus of claim 13, wherein a first subframe of the at least one subframe includes a first slot and a second slot, and the subset of symbols includes m−i+1 consecutive symbols i, i+1, . . . , m of the first slot, where 0≤i≤m and 2≤m≤6.

16. The apparatus of claim 13, wherein x≥2.

17. The apparatus of claim 16, wherein x=p5, where p is an integer greater than or equal to one.

18. The apparatus of claim 13, wherein each sequence of the at least one concatenated sequence from the $i^{th}$ $UE_i$ of the at least one UE is received in a comb structure in every other subcarrier of each symbol of the subset of symbols within a different set of x RBs of the at least one subframe.

19. The apparatus of claim 13, wherein each sequence of the at least one concatenated sequence has length equal to 6x.

20. The apparatus of claim 13, wherein the at least one UE comprises a plurality of UEs, and the at least one concatenated sequence from each UE of the plurality of UEs at least partially overlap in each symbol of the subset of symbols by ax RBs, where a is an integer greater than zero.

21. The apparatus of claim 13, wherein to determine the set of RBs on which each transmission is received from the at least one UE, the at least one processor is further configured to:
   cross correlate the transmission received in each set of x RBs with a known sequence; and
   detect sequences received based on the cross correlation,
   wherein the set of RBs on which each transmission is received from the at least one UE is determined based on the detected sequences.

22. The apparatus of claim 13, wherein each sequence of the at least one concatenated sequence is one of y sequences, where y≥4.

23. The apparatus of claim 22, wherein a first sequence is sequence $s_1$, a second sequence is sequence $s_2$, a third sequence is sequence $s_3$, and a fourth sequence is sequence $s_4$, and wherein the at least one concatenated sequence from an $i^{th}$ $UE_i$ of the at least one UE comprises $z_i$ concatenated sequences, and the $z_i$ concatenated sequences comprise:
   one $s_4$ sequence when $z_i=1$; and
   one $s_1$ sequence, n $s_2$ sequences, and one $s_3$ sequence when $z_i=2+n$, for n≥0.

24. The apparatus of claim 13, wherein each sequence of the at least one concatenated sequence for each UE of the at least one UE is a Zadoff-Chu sequence.

25. An apparatus of wireless communication of a user equipment (UE), comprising:
   means for receiving a transmission in a subset of symbols from at least one UE, each transmission including at least one concatenated sequence in each symbol of the subset of symbols for transmission collision avoidance;
   means for determining a set of resource blocks (RBs) on which each transmission is received from the at least one UE; and
   means for receiving data on each determined set of RBs associated with each UE of the at least one UE, the transmission and the data being received on at least one subframe;
   wherein each symbol of the subset of symbols is associated with at least one subchannel, each of the at least one subchannel extends across x RBs, and each sequence of the at least one concatenated sequence from an $i^{th}$ $UE_i$ of the at least one UE is received in each symbol of the subset of symbols within a different subchannel of the at least one subframe.

26. The apparatus of claim 25, wherein further comprising:
means for determining, for each received transmission from a transmitting UE of the at least one UE, that the data is to be received from the transmitting UE on the determined set of RBs.

27. The apparatus of claim 25, wherein a first subframe of the at least one subframe includes a first slot and a second slot, and the subset of symbols includes m−i+1 consecutive symbols i, i+1, . . . , m of the first slot, where 0≤i≤m and 2≤m≤6.

28. The apparatus of claim 25, wherein x≥2.

29. The apparatus of claim 28, wherein x=p5, where p is an integer greater than or equal to one.

30. The apparatus of claim 25, wherein each sequence of the at least one concatenated sequence from the $i^{th}$ $UE_i$ of the at least one UE is received in a comb structure in every other subcarrier of each symbol of the subset of symbols within a different set of x RBs of the at least one subframe.

31. The apparatus of claim 25, wherein each sequence of the at least one concatenated sequence has length equal to 6x.

32. The apparatus of claim 25, wherein the at least one UE comprises a plurality of UEs, and the at least one concatenated sequence from each UE of the plurality of UEs at least partially overlap in each symbol of the subset of symbols by ax RBs, where a is an integer greater than zero.

33. The apparatus of claim 25, wherein the means for determining the set of RBs on which each transmission is received from the at least one UE is configured to:
cross correlate the transmission received in each set of x RBs with a known sequence; and
detect sequences received based on the cross correlation,
wherein the set of RBs on which each transmission is received from the at least one UE is determined based on the detected sequences.

34. A non-transitory computer-readable medium storing computer executable code for wireless communication of a user equipment (UE), comprising code to:
receive a transmission in a subset of symbols from at least one UE, each transmission including at least one concatenated sequence in each symbol of the subset of symbols for transmission collision avoidance;
determine a set of resource blocks (RBs) on which each transmission is received from the at least one UE; and
receive data on each determined set of RBs associated with each UE of the at least one UE, the transmission and the data being received on at least one subframe;
wherein each symbol of the subset of symbols is associated with at least one subchannel, each of the at least one subchannel extends across x RBs, and each sequence of the at least one concatenated sequence from an $i^{th}$ $UE_i$ of the at least one UE is received in each symbol of the subset of symbols within a different subchannel of the at least one subframe.

* * * * *